United States Patent
Takahashi et al.

(10) Patent No.: US 6,453,120 B1
(45) Date of Patent: *Sep. 17, 2002

(54) IMAGE PROCESSING APPARATUS WITH RECORDING AND REPRODUCING MODES FOR HIERARCHIES OF HIERARCHICALLY ENCODED VIDEO

(75) Inventors: Koji Takahashi, Kanagawa-ken; Motokazu Kashida; Kenji Kawai, both of Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/665,766

(22) Filed: Jun. 19, 1996

Related U.S. Application Data

(62) Division of application No. 08/218,574, filed on Mar. 28, 1994, now Pat. No. 5,563,661.

(30) Foreign Application Priority Data

| Apr. 5, 1993 | (JP) | 5-078225 |
| May 31, 1993 | (JP) | 5-129373 |
| May 21, 1993 | (JP) | 5-142710 |

(51) Int. Cl.[7] ............................................... H04N 7/26
(52) U.S. Cl. ........................................ 386/109; 386/68
(58) Field of Search ........................... 386/109, 112, 386/124, 46, 111, 68, 67, 8, 33, 27, 6; 348/384, 420; 382/232, 240; H04N 5/76, 7/26

(56) References Cited

U.S. PATENT DOCUMENTS

| 5,050,230 A | * | 9/1991 | Jones et al. ................. 382/240 |
| 5,136,391 A | * | 8/1992 | Minami ........................ 386/33 |
| 5,377,051 A | * | 12/1994 | Lane et al. .................. 386/109 |
| 5,493,456 A | * | 2/1996 | Augenbraun et al. ......... 386/68 |

FOREIGN PATENT DOCUMENTS

| EP | 0 443 676 | 2/1990 |
| EP | 0 469 861 | 2/1992 |
| EP | 0 551 979 | 7/1993 |
| EP | 0 556 816 | 8/1993 |
| EP | 0 598 184 | 5/1994 |
| GB | 2 257 868 | 1/1993 |
| GB | 2 259 421 | 3/1993 |
| WO | WO 90/10353 | 9/1990 |

OTHER PUBLICATIONS

Patent Abstracts of Japan No. JP 04057482, published Feb. 25, 1992, vol. 16, No. 259.

"COSMIC: A Compatible Scheme for Moving Image Coding", Morrison, et al., vol. 5, No. 1/02, Feb. 1, 1993, pp. 91–103.

* cited by examiner

*Primary Examiner*—Robert Chevalier
(74) *Attorney, Agent, or Firm*—Robin, Blecker & Dale

(57) ABSTRACT

An image processing apparatus includes an image pickup circuit having a plurality of photographic modes, such as television standards, a compression processing circuit for performing compression processing of an image pickup signal outputted from the image pickup circuit, the compression circuit having a plurality of compression modes, and a selecting circuit for selecting one of the compression modes of the compression processing circuit in accordance with a selected one of the photographic modes of the image pickup circuit.

7 Claims, 40 Drawing Sheets

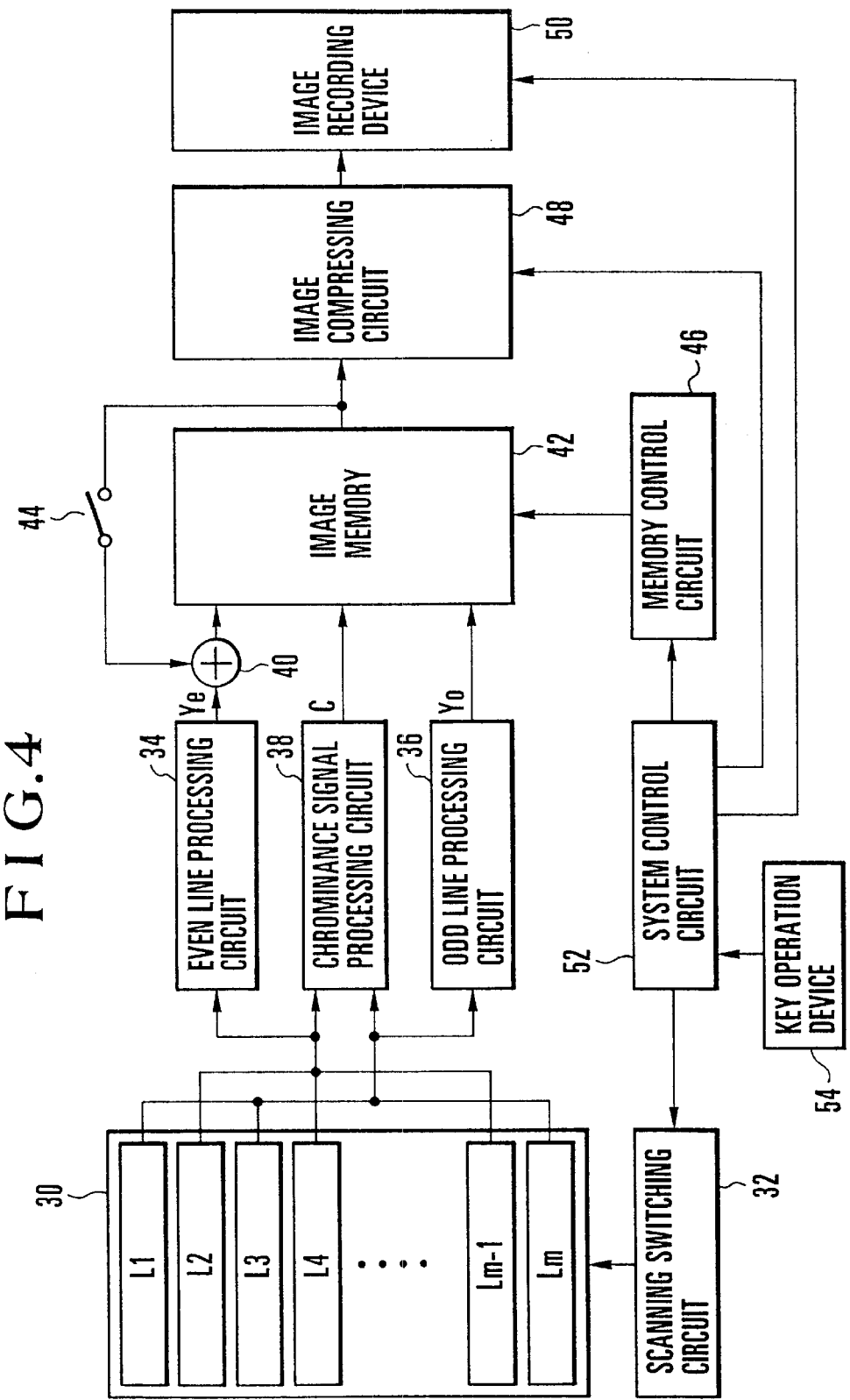

FIG.11

| SELECTED MODE | IMAGE PICKUP SYSTEM | COMPRESSION RATIO | RECORDING DATA RATE |
|---|---|---|---|
| HD | HD | 1/10 | 50Mbps |
| SD-High | SD | 1/5 | 25Mbps |
| SD-Low | SD | 1/10 | 12.5Mbps |

FREQUENCY PLANE

ZIGZAG SCAN

FIG. 22

| RECORDING MODE<br>PARAMETER | SD-Low | SD-High | HD |
|---|---|---|---|
| TAPE SPEED | HALF SPEED | STANDARD SPEED | DOUBLE SPEED |
| NUMBER OF TRACKS/FIELD | 5 TRACKS | 10 TRACKS | 20 TRACKS |
| COMPRESSION RATIO | 1/10 | 1/5 | 1/10 |
| DATA RATE | 12.5Mbps | 25Mbps | 50Mbps |

FIG.47

| REPRODUCING APPARATUS SD | RECORDING MODE | |
|---|---|---|
| | SD | HD |
| REPRODUCING MODE — SD | POSSIBLE | POSSIBLE |
| REPRODUCING MODE — HD | IMPOSSIBLE | IMPOSSIBLE |

FIG.48

| REPRODUCING APPARATUS HD | RECORDING MODE | |
|---|---|---|
| | SD | HD |
| REPRODUCING MODE — SD | POSSIBLE | POSSIBLE |
| REPRODUCING MODE — HD | POSSIBLE IN THE CASE OF RESOLUTION OF SD QUALITY | POSSIBLE |

IMAGE PROCESSING APPARATUS WITH RECORDING AND REPRODUCING MODES FOR HIERARCHIES OF HIERARCHICALLY ENCODED VIDEO

This application is a division, of application Ser. No. 08/218,574, filed Mar. 28, 1994 now U.S. Pat. No. 5,563,661.

BACKGROUND OF THE INVENTION

1. Field of the Invention

The present invention relates to an image processing apparatus including an image pickup system and compression processing means for compressing a photographic image obtained from the image pickup system.

2. Description of the Related Art

FIG. 1 is a schematic block diagram showing the arrangement of a conventional example in which a video camera is integrated with a digital video tape recorder for digitally recording a video signal.

In the example shown in FIG. 1, an image pickup device 10 is provided with a complementary color filter and performs pseudo-interlaced reading of electric charge stored by field storage. Specifically, as shown in FIG. 2, the image pickup device 10 is provided with a mosaic color filter made up of filter elements: white (W), cyan (Cy), yellow (Ye) and green (G). The image pickup device 10 outputs the added values of two adjacent upper and lower lines, and a luminance signal processing circuit 12 adds together the values of two adjacent pixels contained in the output of the image pickup device 10, thereby forming a luminance signal. A chrominance signal processing circuit 14 obtains differences between the values of the two adjacent pixels, thereby forming color-difference signals.

More specifically, a luminance signal $Yn$ obtained from a line #n and a luminance signal $Yn+1$ obtained from a line #(n+1) are as follows:

$$Yn = (W+Cy) + (G+Ye)$$

$$Yn+1 = (W+Ye) + (G+Cy)$$

and the associated chrominance signals $Cn$ and $Cn+1$ are as follows:

$$Cn = (W+Cy) - (G+Ye)$$

$$Cn+1 = (W+Ye) - (G+Cy)$$

If the characteristic of each filter element W is equal to the sum of R (red), G (green) and B (blue), i.e., R+G+B; the characteristic of each filter element Cy is equal to B+G; and the characteristic of each filter element Ye is equal to Ye=R+G, the following equations are obtained:

$$Yn = Yn+1 = 2R + 4G + 2B$$

$$Cn = 2(B-G)$$

$$Cn+1 = 2(R-G)$$

As shown in FIG. 2, the line numbers of adjacent upper and lower lines to be added together are made to differ between an even field and an odd field, whereby an interlaced signal is obtained. To perform this addition, the image pickup device 10 needs to be provided with a photoelectric conversion element having lines the number of which is equivalent to the number of lines per frame (in the NTSC system, 525 lines). In the case of the NTSC system, in a line Lm of the image pickup device 10 shown in FIG. 1, m is 525.

A luminance signal Y formed by the luminance signal processing circuit 12 and a chrominance signal C formed by the chrominance signal processing circuit 14 are stored in an image memory 16 under the control of a memory control circuit 18. When image data for one frame are stored in the image memory 16, a motion detecting circuit 20 discriminates between a moving image portion and a still image portion. An image compressing circuit 22 compresses the image data supplied from the image memory 16, by using correlations present in the image. At this time, the image compressing circuit 22 adaptively switches compression algorithms between the still image portion and the moving image portion in accordance with the detection result provided by the motion detecting circuit 20.

The compressed image data is applied to an image recording device 24, and the image recording device 24 records the compressed image data on a recording medium.

A system control circuit 26 controls the entire arrangement in accordance with the operation of a key operation device 28.

In the above-described arrangement, pseudo-interlaced field images are compressed and recorded on the recording medium.

In the conventional example in which compression processing is performed after field images are combined into a frame image, there is the problem that if field images of a fast moving subject are combined into a frame image, the resultant image may be blurred as shown in FIGS. 3(a) to 3(c). FIG. 3(a) shows an odd field image, FIG. 3(b) shows the succeeding even field image, and FIG. 3(c) shows the frame image obtained by combining the odd and even field images.

Compression of an image utilizes correlations which appear in the image in the space and time-axis directions thereof. In general, a frame picture the vertical line-to-line distance of which is smaller than that of a field picture contains higher correlations. For this reason, as described above, the conventional example adopts the compression method of adaptively switching compression algorithms between a still image portion and a moving image portion in a frame image.

As a result, the conventional example necessarily needs a motion detecting circuit for detecting a still image portion and a moving image portion, and, in addition, a substantially high detection accuracy is needed. This problem makes it difficult to reduce the size of the circuit.

As is known to those skilled in the art, since a conventional camera-integrated type of VTR does not conform to a plurality of television standards, a plurality of camera-integrated types of VTRs must be prepared and selectively used according to individual purposes. With the diversification of broadcasting systems, it becomes far more necessary to exchange program software tapes between different nations or to produce software conforming to multiple broadcasting systems. However, if a plurality of broadcasting systems are to be handled, a plurality of existing VTRs are needed, so that practical inconveniences will be encountered. For this reason, it has been desired to provide a VTR unit capable of conforming to multiple broadcasting systems.

As is also known to those skilled in the art, systems for recording and reproducing a digitized video signal are individually designed according to necessary image qualities or recordable/reproducible data rates. However, if system designs differ in coding sampling frequency which is a primary parameter for determining image quality, when one system is connected to another video system, various problems occur.

Such conventional systems which are separately designed according to individual required image qualities have the problem that it is impossible to readily exchange image data between systems via media.

SUMMARY OF THE INVENTION

It is, therefore, an object of the present invention to provide an image processing apparatus capable of solving the above-described problems.

To achieve the above object, in accordance with one aspect of the present invention, there is provided an image processing apparatus which comprises image pickup means having a plurality of photographic modes, compression processing means for performing compression processing of an image pickup signal outputted from the image pickup means, the compression means having a plurality of compression modes, and selecting means for selecting one of the compression modes of the compression processing means in accordance with a selected one of the photographic modes of the image pickup means.

According to the above arrangement, it is possible to fully utilize the performance of the compression processing means, so that it is possible to realize a good image quality and a high compression ratio.

Another object of the present invention is to provide a video recording apparatus, a video reproducing apparatus and a video recording and reproducing apparatus, such as a multimode-capable camera-integrated type VTR capable of effecting camera photography, compression signal processing and video recording according to a plurality of television standards.

To achieve the above object, in accordance with another aspect of the present invention, there is provided a video recording apparatus which comprises image pickup means capable of conforming to a plurality of television standards, recording means for compressing data outputted from the image pickup means at a compression ratio according to a television standard selected from the plurality of television standards and recording on a recording medium compressed data and identification information for identification of the selected television standard, setting means for setting the selected television standards, and controlling means for controlling the image pickup means and the recording means in accordance with a setting of the setting means.

To achieve the above object, in accordance with another aspect of the present invention, there is provided a video reproducing apparatus which comprises reproducing means for reproducing video data compressed according to a television standard and identification information for identification of the television standard from a recording medium on which the video data and the identification information are recorded, and performing expansion processing of the video data, and controlling means for controlling the reproducing means on the basis of the identification information reproduced from the recording medium.

To achieve the above object, in accordance with another aspect of the present invention, there is provided a video recording and reproducing apparatus which comprises a system converter for converting a first video signal conforming to a first television standard into a second video signal conforming to a second television standard, recording means for recording the first or second video signal on a recording medium, switching means for supplying to the recording means the first video signal or the second video signal obtained from the system converter, reproducing means for reproducing the first or second video signal from the recording medium, and signal supplying means for supplying the first video signal reproduced by the reproducing means to the system converter.

According to the first two aspects of the present invention, with a single camera-integrated type VTR, it is possible to automatically perform recording processing and reproduction processing according to a plurality of compression modes which conform to a plurality of television standards.

According to the third aspect of the present invention, the system converter is used during both recording and reproduction so that it is possible to perform recording and reproduction of or provide a monitor output of a video signal according to a desired television standard.

In accordance with another aspect of the present invention which has been made to solve the aforesaid problems, there is provided a video system which comprises recording means for recording video information, which is hierarchically coded, while forming a data recording area on a recording medium in accordance with a hierarchical structure of the video information and at least one recording mode of a plurality of recording modes each having a different recording processing, and reproducing means capable of setting a reproduction mode according to the at least one recording mode and the hierarchical structure, or reproducing means capable of setting a reproduction mode within a range of the hierarchical structure irrespective of the at least one recording mode.

According to the above aspect, it is possible to perform reproduction processing for reproducing recorded data from an information recording medium which is recorded in one of the plurality of recording modes, in an arbitrary reproduction mode in accordance with the conditions of a reproduction side. The recorded data is reproduced from only a data recording area which corresponds to a necessary information hierarchy within information hierarchically recorded on a recorded tape.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 4 is a schematic block diagram of the arrangement of an image processing apparatus according to one embodiment of the present invention;

FIG. 11 is a comparative table of operating modes;

FIG. 22 is a table of the recording characteristics of individual modes;

FIG. 47 is a list of the reproducing modes of a hierarchical VTR for SD signals;

FIG. 48 is a list of the reproducing modes of a hierarchical VTR for HD signals.

DETAILED DESCRIPTION OF THE PREFERRED EMBODIMENTS

The present embodiments are based on the arrangement in which the present invention is applied to an image processing apparatus capable of coping with a plurality of photographic modes or television standards, as well as of performing recording and reproduction processings on hierarchically coded video signals.

Each of the embodiments of the present invention will be described below with reference to the accompanying drawings.

Figure 1:
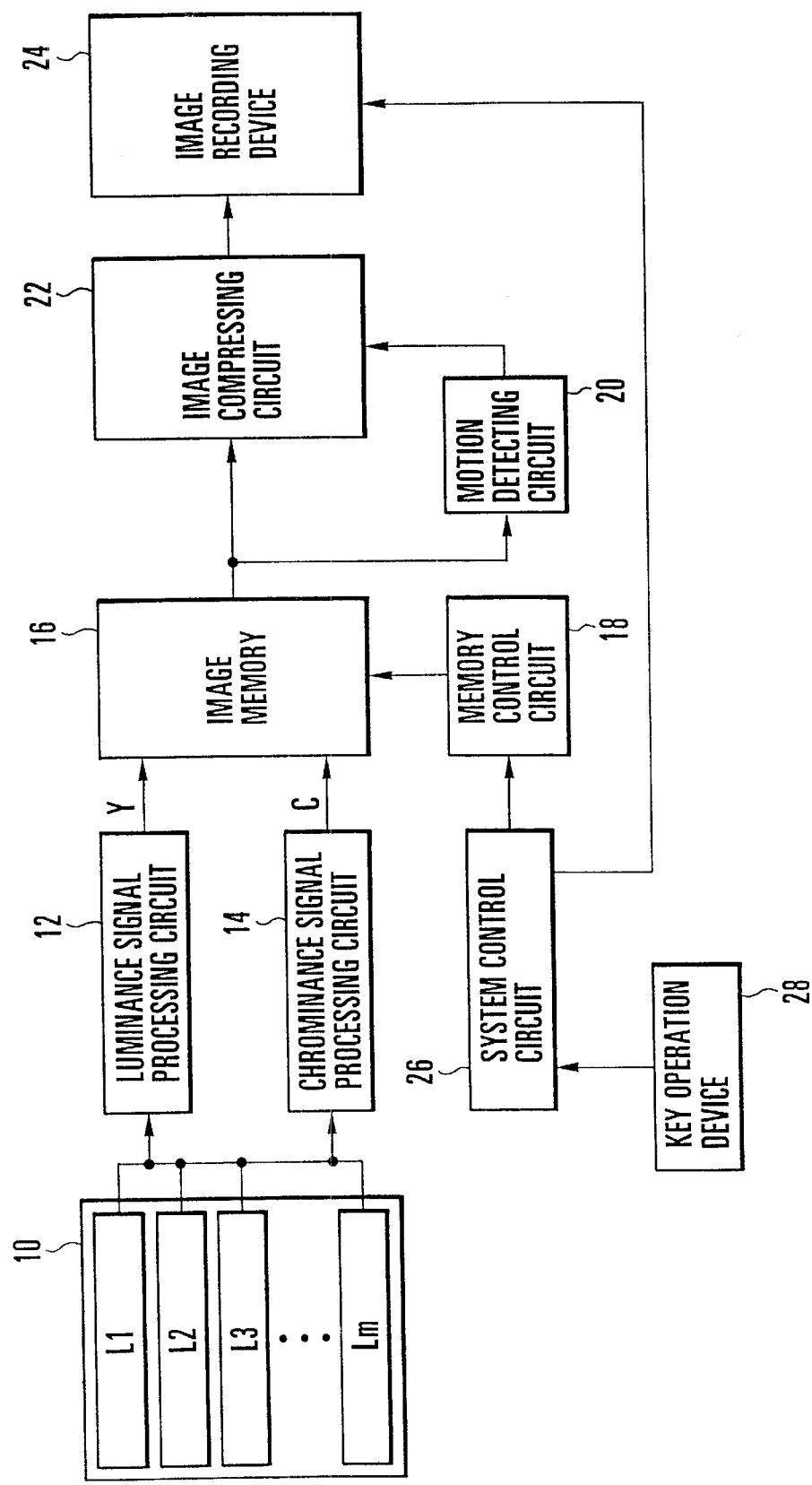
FIG. 1 is a schematic block diagram of the arrangement of a conventional camera-integrated type digital recording apparatus.
Figure 2:
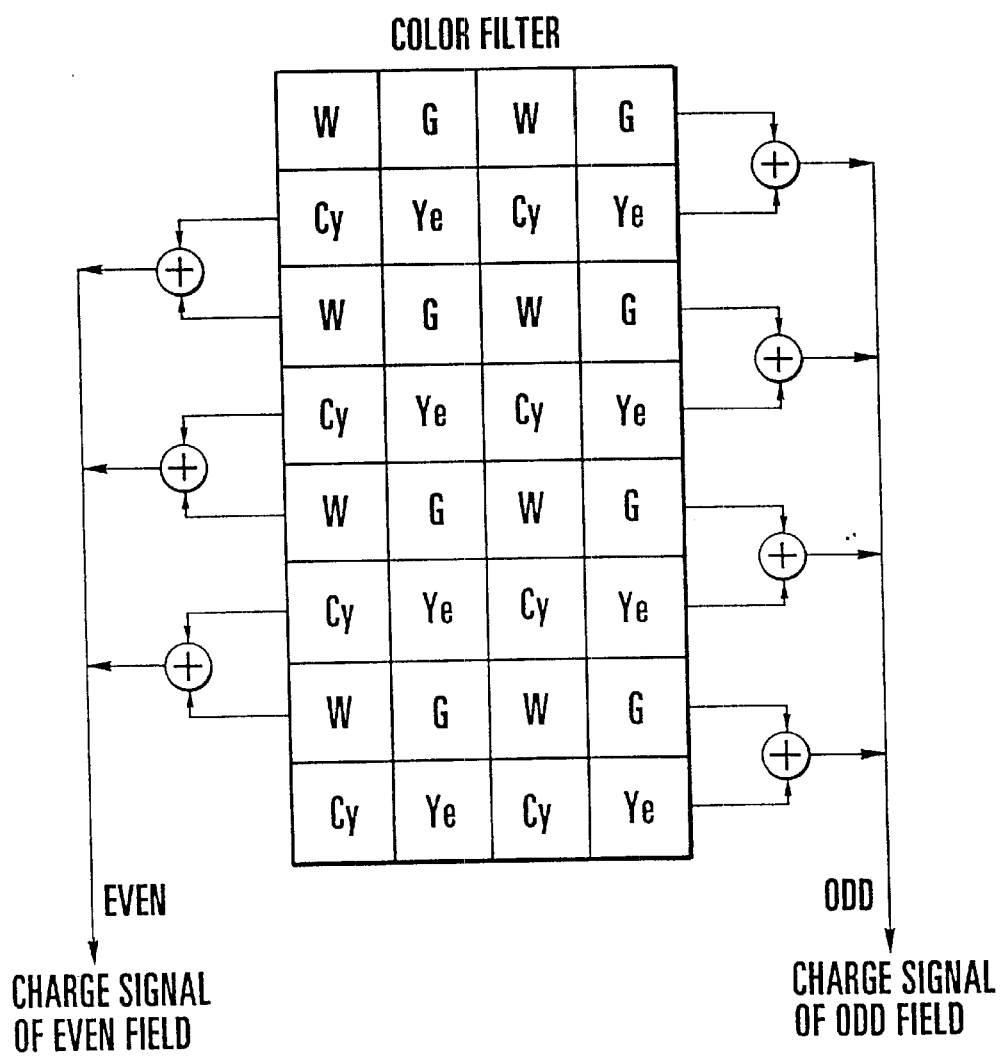
FIG. 2 is an explanatory view of the color-filter arrangement of the image pickup device shown in FIG. 1 and the manner of reading of electric charge therefrom.
Figure 3A:
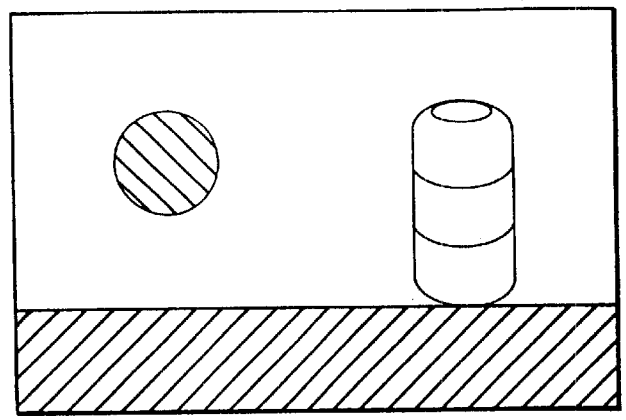
FIGS. 3(a), 3(b) and 3(c) are explanatory views of an image blur occurring in a frame image as the result of a combination of field images.
Figure 3B:
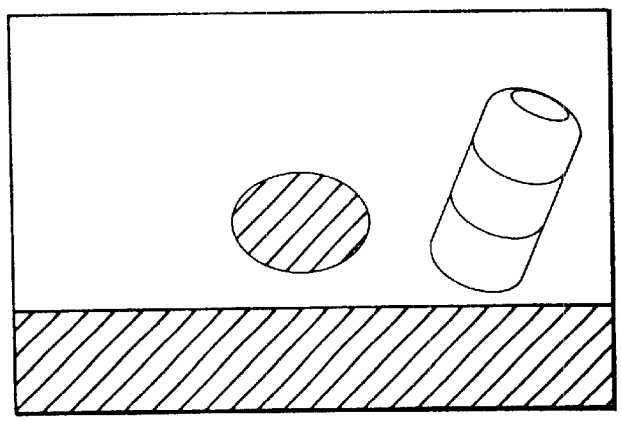
Figure 3C:
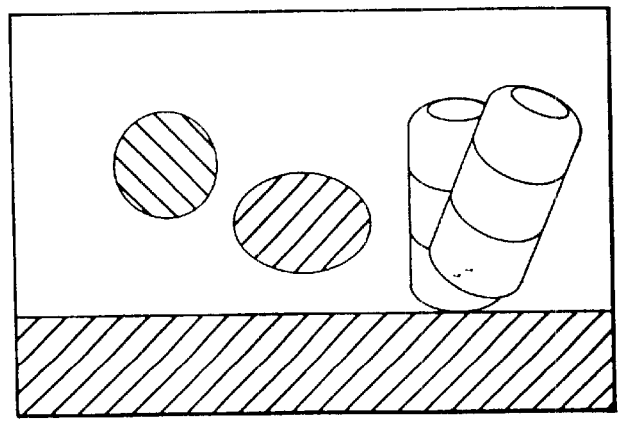
Figure 5:
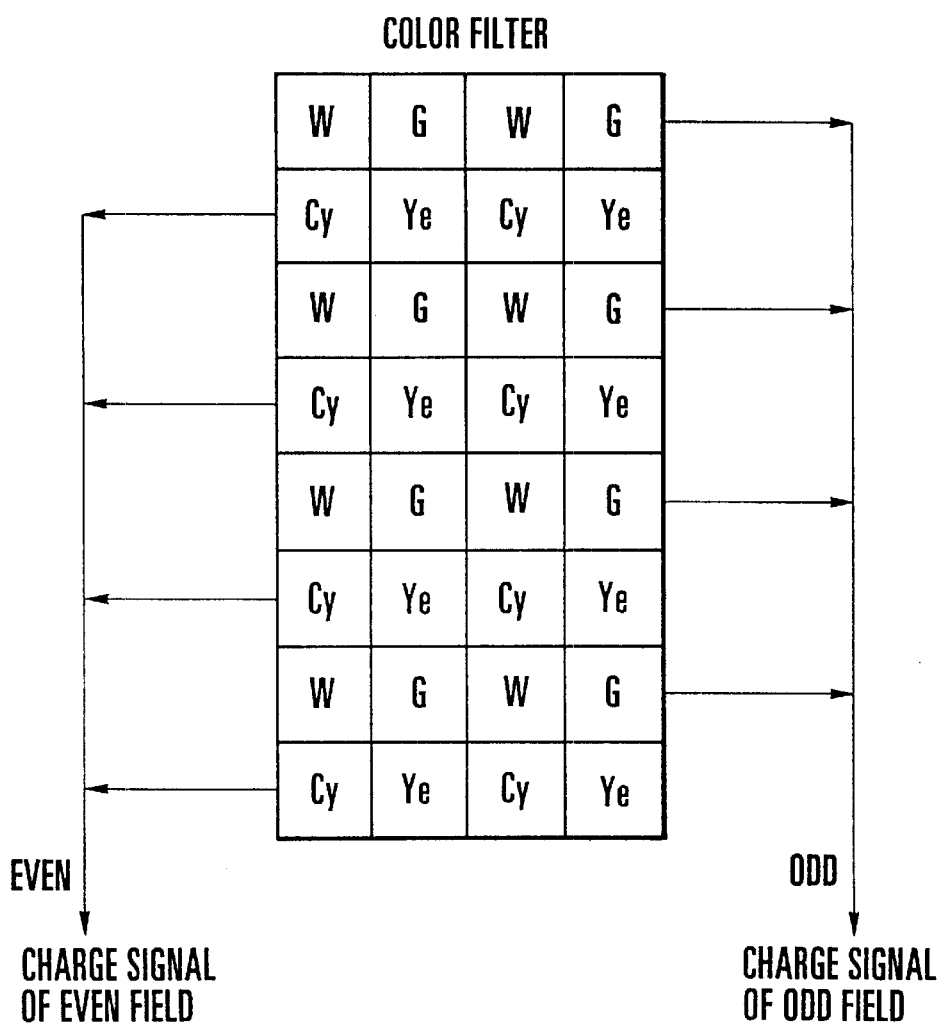
FIG. 5 is an explanatory view of the color-filter arrangement of the image pickup device shown in FIG. 4 and the manner of reading of electric charge therefrom.

FIG. 4 is a schematic block diagram showing the arrangement of an image processing apparatus according to one embodiment of the present invention. An image pickup device 30 is capable of selectively performing a field reading operation and a frame reading operation, and the color-filter arrangement of the image pickup device 30 is identical to that of the image pickup device 10 shown in FIG. 1. Although the image pickup device 10 is arranged to output the results of additions of the respective pairs of adjacent lines, the image pickup device 30 of this embodiment is capable of independently outputting a charge signal from each pair of adjacent lines, as shown in FIG. 5. The field reading operation and the frame reading operation of the image pickup device 30 primarily differ in reading frequency, and switching between the field reading operation and the frame reading operation is performed by a scanning switching circuit 32.

An even line processing circuit 34 computes charge signals read from the even lines of the image pickup device 30, with respect to all the adjacent pixels, thereby forming a luminance signal Ye of an even field. An odd line processing circuit 36 computes charge signals read from the odd lines of the image pickup device 30, with respect to all the adjacent pixels, thereby forming a luminance signal Yo of an odd field. Also, a chrominance signal processing circuit 38 performs addition of the charge signals read from the even and odd lines of the image pickup device 30, with respect to all the adjacent lines, as well as subtraction of the same charge signals with respect to all the adjacent pixels, thereby a chrominance signal C.

Specifically, a luminance signal Yn obtained from a line #n of the odd field and a luminance signal Yn+1 obtained from a line #(n+1) are as follows:

$$Yn=W+G$$

$$Yn+1=Cy+Ye$$

and the associated chrominance signals Cn and Cn+1 are as follows:

$$Cn=(W+Cy)-(G+Ye)$$

$$Cn+1=(W+Ye)-(G+Cy)$$

If the characteristic of each filter element W is equal to the sum of R (red), G (green) and B (blue), i.e., R+G+B; the characteristic of each filter element Cy is equal to B+G; and the characteristic of each filter element Ye is equal to Ye=R+G, the following equations are obtained:

$$Yn=Yn+1=R+2G+B$$

$$Cn=2(B-G)$$

$$Cn+1=2(R-G)$$

Regarding the even field as well, luminance signals and chrominance signals can be obtained through similar computations.

Photoelectrically converted signals, which have been obtained from lines L1 to Lm (m=525 in the NTSC system) corresponding to horizontal scanning lines which constitute a television picture, are applied to the even line processing circuit 34, the odd line processing circuit 36 and the chrominance signal processing circuit 38, and the luminance signal Ye and the luminance signal Yo as well as the chrominance signal C which is common to the signals Ye and Yo are formed.

A frame photographic image outputted from the image pickup device 30 is stored in an image memory 42 in the following manner. The image pickup device 30 outputs the photoelectrically converted signals of all the lines in the order of the lines, or simultaneously outputs the respective photoelectrically converted signals of the even lines and the odd lines in line order. Since a switch 44 is open, the luminance signal Ye formed by the even line processing circuit 34 passes through an adder 40 without being subject to addition, and is applied to the image memory 42. The luminance signal Yo formed by the odd line processing circuit 36 and the chrominance signal C formed by the chrominance signal processing circuit 38 are also applied to the image memory 42. The image memory 42 stores the luminance signals Ye and Yo and the chrominance signal C under the control of a memory control circuit 46. Thus, a frame image obtained by one exposure cycle is stored in the image memory 42. The above-described operation is hereinafter referred to as the "frame image pickup mode".

The operation of combining field photographic images obtained by the image pickup device 30 to form a frame image and storing the resultant frame image in the image memory 42 is performed in the following manner. The image pickup device 30 outputs the photoelectrically converted signals of all the lines in the order of the lines, or simultaneously outputs the respective photoelectrically converted signals of the even lines and the odd lines in line order. In this reading stage, image data for an odd field is first stored in the image memory 42. Specifically, the image memory 42 stores the luminance signal Yo of the odd field which is formed by the odd line processing circuit 36 as well as the chrominance signal C formed by the chrominance signal processing circuit 38.

During the next field, the switch 44 is closed and the image memory 42 is made to operate in a read modify write mode, thereby feeding the stored luminance signal Yo back to the adder 40 through the switch 44. Similarly to the aforesaid odd field, the image pickup device 30 outputs the photoelectrically converted signals of all the lines in the order of the lines, or simultaneously outputs the respective photoelectrically converted signals of the even lines and the odd lines in line order. In this reading stage, the even line processing circuit 34 and the chrominance signal processing circuit 38 operate, and the adder 40 adds the luminance signal Yo fed back from the image memory 42 to the luminance signal Ye formed by the even line processing circuit 34. Thus, it is possible to obtain a result similar to the result of two-line addition described previously in connection with the conventional example. The image memory 42 sequentially stores the output of the adder 40 and the output of the chrominance signal processing circuit 38 into predetermined memory locations. Thus, a frame image in which the field images obtained through two exposure cycles are combined is stored in the image memory 42. The above-described operation is referred to as the "field image pickup mode".

When the image data for one frame is stored in the image memory 42, the image compressing circuit 48 compresses the image data stored in the image memory 42 in a compression mode according to a control signal supplied from a system control circuit 52. For example, according to which of the frame image pickup mode and the field image pickup mode is active, a block to be formed by block coding such as DCT (discrete cosine transform), which block is a main unit in image compression processing, is determined as a field-based block or a frame-based block.

The compressed image data outputted from the image compressing circuit 48 is applied to an image recording device 50, and the image recording device 50 records the compressed image data on a recording medium.

The system control circuit 52 controls the entire apparatus in accordance with the operation of a key operation device 54.

As a matter of course, it is also possible to select a compression system from among various compression coding systems other than DCT. For example, if a DPCM system which is one kind of predictive coding system is employed, in the case of the field image pickup mode in which a higher correlation appears in a horizontal direction than in a vertical direction, compression is performed by a horizontal DPCM system of performing a differential computation in the horizontal direction, while, in the case of the frame image pickup mode in which a higher correlation appears in a vertical direction than in a horizontal direction, compression is performed by a vertical DPCM system of performing a differential computation in the vertical direction.

In the above-described embodiment, switching between field-based image compression and block-based image compression is performed according to which of the field image pickup mode and the frame image pickup mode has been selected. However, as a matter of course, it is also possible to adopt an arrangement capable of selecting the field image pickup mode or the frame image pickup mode in accordance with whether the field-based image compression or the frame-based image compression has been selected. In other words, it is possible to reduce a degradation of image quality by linking the field image pickup mode or the frame image pickup mode with the field-based image compression or the frame-based image compression.

Figure 6:
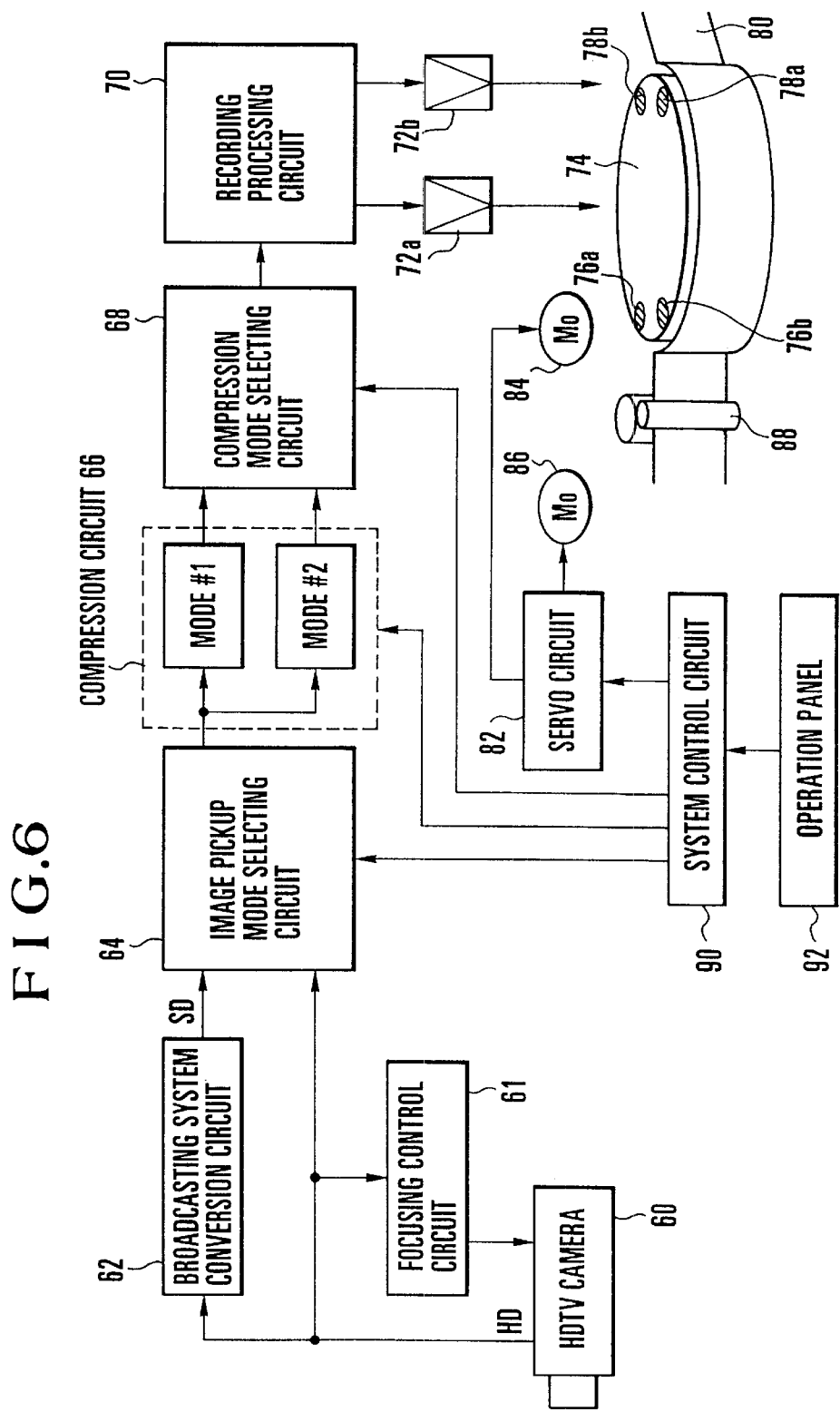
FIG. 6 is a schematic block diagram of the arrangement of a camera-integrated type video recording apparatus according to a second embodiment of the present invention.

Another embodiment of the present invention will be described below in which the present invention is applied to a camera-integrated type video recording apparatus which is compatible to an existing broadcasting system (for example, the NTSC system (SD)) and a high-definition television system (for example, a "high-vision" system (HD)) and of performing camera photography, compression processing and recording which is intended to two layers of image structures (SD and HD) each having a different image-quality design. FIG. 6 is a schematic block diagram of the arrangement of the entire apparatus.

Referring to FIG. 6, an HDTV camera 60 is arranged to output a high-definition television signal, i.e., an HD signal. According to a television studio standard, the number of effective pixels per picked-up image is 1,920 pixels in the horizontal direction and 1,035 pixels in the vertical direction, and the sampling frequency is 75.3 MHz. The output of the camera 60 enters two different paths. The signal which has entered one path is applied to an image pickup mode selecting circuit 64 via a broadcasting system conversion circuit 62, while the signal which has entered the other paths is directly applied to the image pickup mode selecting circuit 64.

The broadcasting system conversion circuit 62 is a down converter for converting an HD signal into a signal conforming to any of the NTSC, PAL and SECAM systems which are standard broadcasting systems (hereinafter referred to as the "SD system").

Figure 7:
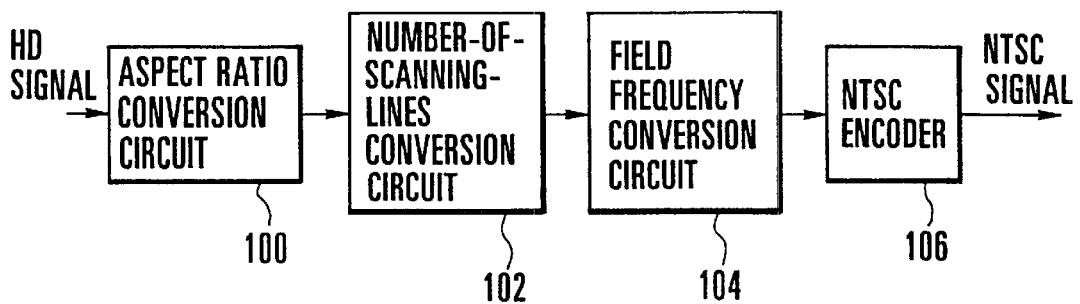
FIG. 7 is a schematic block diagram of one example of the broadcasting system conversion circuit shown in FIG. 6.

One example of the broadcasting system conversion circuit 62 for converting an HD signal into an NTSC signal is shown in FIG. 7. Since the HD signal has an aspect ratio of 16:9 and the SD signal has an aspect ratio of 4:3, an aspect ratio conversion circuit 100 converts the 16:9 aspect ratio into the 4:3 aspect ratio.

Figure 8:
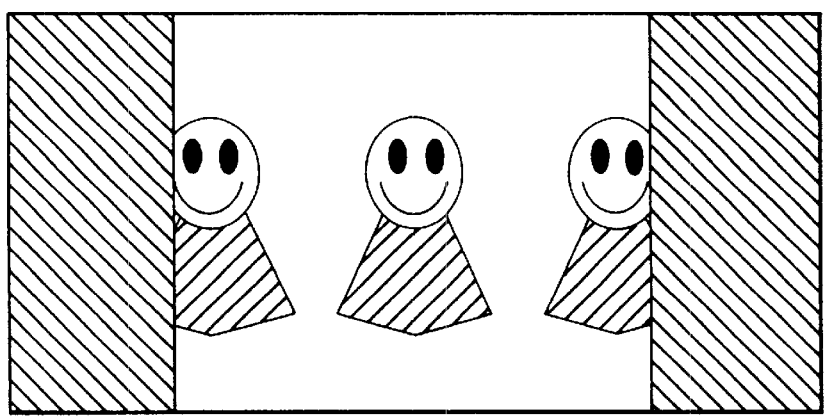
FIG. 8 is an explanatory, schematic view of a side panel system for aspect-ratio conversion.
Figure 9:
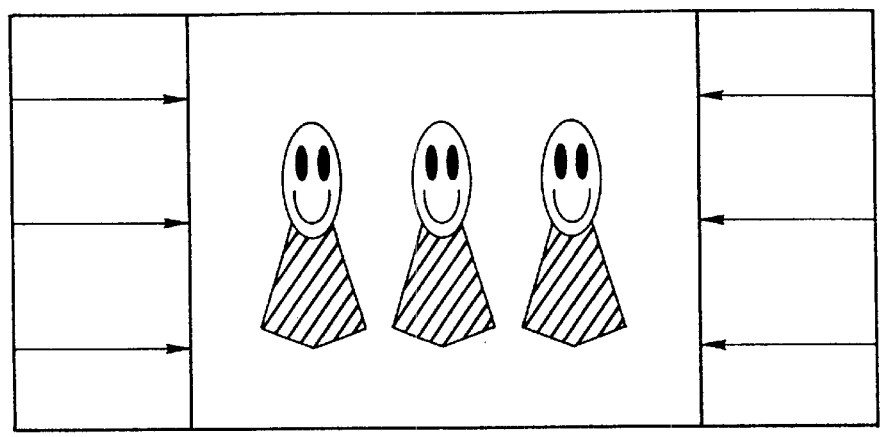
FIG. 9 is an explanatory, schematic view of a squeeze system for aspect-ratio conversion.
Figure 10:
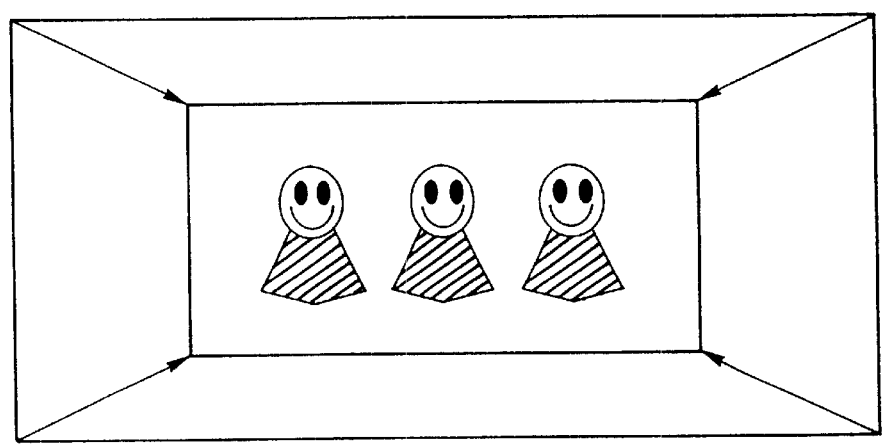
FIG. 10 is an explanatory, schematic view of a letter box system for aspect-ratio conversion.

Specifically, it is possible to select a desired system from among a side panel system in which the right and left end portions of a high-vision image are omitted (refer to FIG. 8), a squeeze system (or a full-display system) in which a high-vision image is compressed in the horizontal direction (refer to FIG. 9), and a letter box system in which an image of 16:9 aspect ratio is displayed in a picture of 4:3 aspect ratio (refer to FIG. 10). In the case of the letter box system, although empty spaces are formed in the top and bottom portions of a picture, they are displayed in black. If the HD signal is to be converted into the NTSC system, the side panel system or the squeeze system is suitable, while the letter box system is suited to a case where it is desired to fully utilize the photographic field angle of the HD camera 60.

The HD signal and the SD signal greatly differ in the number of horizontal scanning lines. A number-of-scanning-lines conversion circuit 102 converts the number of horizontal scanning lines of the HD output of the aspect ratio conversion circuit 100 into the number of horizontal scanning lines conforming to the SD system. For example, signals for the required horizontal scanning lines are formed by a vertical interpolation filter.

A field frequency conversion circuit 104 converts the field frequency of the output of the number-of-scanning-lines conversion circuit 102 (60 HZ in the case of the high-definition signal) into a field frequency conforming to the SD system (59.94 Hz in the case of the NTSC system). This frequency conversion can be executed at real time by a time-base corrector having a function similar to a frame synchronizer.

In a generally used frame synchronizer, in the case of a capacity of one frame memory, one frame cap occurs at intervals of approximately 33 seconds and causes an unnatural discontinuity in a moving image. In contrast, motion-adaptive type field frequency conversion detects motions and scene changes by using a frame difference signal, and performs frame skipping if the following four conditions are satisfied:

1) an image signal indicates a still image;
2) a scene change has occurred;
3) a moving-image area is comparatively small; and
4) a frame buffer memory is full.

An NTSC encoder 106 converts the output of the field frequency conversion circuit 104 into a television signal conforming to the NTSC system.

In the present embodiment, in the case of the SD system as well, it is possible to select a high image quality mode for business use (horizontal resolution: approximately 450 lines) and a standard image quality mode for home use (horizontal resolution: approximately 230 lines). The former mode is hereinafter referred to as the "SD-High mode", while the latter mode is hereinafter referred to as the "SD-Low mode". A mode for recording the HD signal is hereinafter referred to as the "HD mode". An operator can selectively set the HD mode, the SD-High mode or the SD-Low mode by means of an operation panel 92, and a system control circuit 90 controls the image pickup mode selecting circuit 64 in accordance with the mode set by the operator. The image pickup mode selecting circuit 64 selects the HD signal output of the camera 60 in the case of the HD mode or the output of the broadcasting system conversion circuit 62 in the case of the SD-High mode or the SD-Low mode.

The signal selected by the image pickup mode selecting circuit 64 is applied to a compression circuit 66. The compression circuit 66 is provided with a plurality of compression modes (in the shown example, a mode #1 and a mode #2) so that a compression ratio and a compression coding system can be individually selected. The compression ratio is selected from among, for example, ¼, ⅛, ¹⁄₁₆ and ¹⁄₃₂. The compression coding system is selected from, for example, DCT, DPCM, Hadamard transform and ADRC. In the arrangement shown in FIG. 6, for example, DCT and DPCM may be allocated to the compression mode #1 and the compression mode #2, respectively, or the compression ratio may be varied under a single compression coding system.

The compression circuit 66 compresses the output of the image pickup mode selecting circuit 64 in the compression mode #1 as well as in the compression mode #2. The data compressed in the compression mode #1 and the compression mode #2 are both applied to a compression mode selecting circuit 68. The compression mode selecting circuit 68 selects either one of the data compressed in the compression mode #1 and the data compressed in the compression mode #2, in accordance with a control signal supplied from the system control circuit 90, and applies the selected compressed data to a recording processing circuit 70.

The modes to be selected by the image pickup mode selecting circuit 64 and the compression mode selecting circuit 68 are closely related to factors, such as a recording time or image quality to be selected for a recording system and the quality of an image to be picked up by the camera 60 or a mode set for the camera 60. The modes are automatically determined in association with such factors.

According to a relationship with a recording system which will be described later, it is desirable that the data rates of images compressed in the respective compression modes have a relationship represented by an integer ratio, for example, 50 Mbps in the HD mode, 25 Mbps in the SD-High mode and 12.5 Mbps in the SD-Low mode, as shown in FIG. 22.

A recording processing circuit 70 applies recording processing, such as modulation, to the compressed data supplied from the compression mode selecting circuit 68, divides the processed data into two channels, and outputs the divided data to the respective channels. Recording amplifiers 72a and 72b amplify the respective outputs of the recording processing circuit 70. A rotary drum 74 is provided with two pairs of heads 76a, 76b and 78a, 78b. The outputs of the recording amplifiers 72a and 72b are respectively recorded on a magnetic tape 80 by the heads 76a, 76b and 78a, 78b. The width of each track formed on the magnetic tape 80 is the same for any of the HD mode, the SD-High mode and the SD-Low mode.

A servo circuit 82 causes a drum motor 84 to rotate the rotary drum 74 at a predetermined rotational speed, and also causes a capstan motor 86 to rotate a capstan 88, thereby causing the magnetic tape 80 to run at a predetermined speed. The system control circuit 90 supplies to the servo circuit 82 a target value based on an operation mode according to an operation instruction inputted through the operation panel 92.

FIG. 11 shows the relationships between the modes selected through the operation panel 92 and the image pickup systems, the compression ratios and the recording data rates.

The camera 60 shown in FIG. 6 will be described in detail with reference to FIG. 12. A photographic lens unit 110 includes a focusing lens 110a for adjusting its focal length and a zooming lens 110b for varying its magnification, and focuses an optical image of a subject on the photoelectric conversion face of an image pickup device 114 via an iris 112. A predetermined color filter 116 is attached to the photoelectric conversion face of the image pickup device 114.

The image pickup device 114 operates in accordance with a clock supplied from a clock generating circuit 118, and outputs a charge signal. The output of the image pickup device 114 is noise-reduced by a CDS circuit 120 and is then gain-controlled by an AGC circuit 122. The output of the AGC circuit 122 is applied to an exposure control circuit 124, a focus control circuit 126, a white balance adjustment circuit 128 and a color processing circuit 130.

A driving circuit 132a and a motor 132b drive the focusing lens 110a along the optical axis, a driving circuit 134a and a motor 134b drive the zooming lens 110b along the optical axis, and a driving circuit 136a and a motor 136b drive the iris 112 to cause it to open and close.

A system control circuit 138 controls the gain of the AGC circuit 122 in accordance with the output of the exposure control circuit 124, and also controls the degree of opening of the iris 112 by means of the driving circuit 136a and the motor 136b. The system control circuit 138 adjusts the position of the focusing lens 110a along the optical axis by means of the driving circuit 132a and the motor 132b in accordance with the output of the focus control circuit 126, thereby placing the photographic lens unit 110 into an in-focus state.

The white balance adjustment circuit 128 forms a control signal for white balance adjustment, and the system control circuit 138 controls the color processing circuit 130 in accordance with the output of the white balance adjustment circuit 128. The color processing circuit 130 generates a white-balanced luminance signal Y as well as color-difference signals R-Y and B-Y from the output of the AGC circuit 122. A process circuit 140 converts into RGB signals the luminance signal Y and the color-difference signals R-Y and B-Y outputted from the color processing circuit 130, and an encoder 142 generates a composite signal from the output of the process circuit 140. The encoder 142 also outputs video signals in Y/C separation form.

The outputs of the color processing circuit 130 and the outputs of the process circuit 140 may of course be outputted to the outside as component outputs.

A display generating circuit 144 generates display signals indicative of operation mode, time and date and the like under the control of the system control circuit 138, and an adder 146 adds the output of the display generating circuit 144 to the composite output of the encoder 142 and applies a signal indicative of the addition result to an electronic viewfinder 148. Thus, a photographer can view various kinds of information together with a subject to be photographed, on the screen of the electronic viewfinder 148. Further, since a composite signal is inputted to the electronic viewfinder 148 from a reproducing system which will be described later, it is possible to view a reproduced image.

The photographer also can set photographic conditions, such as photographic mode, photographic magnification and exposure, by operating an operation key 150.

Figure 12:
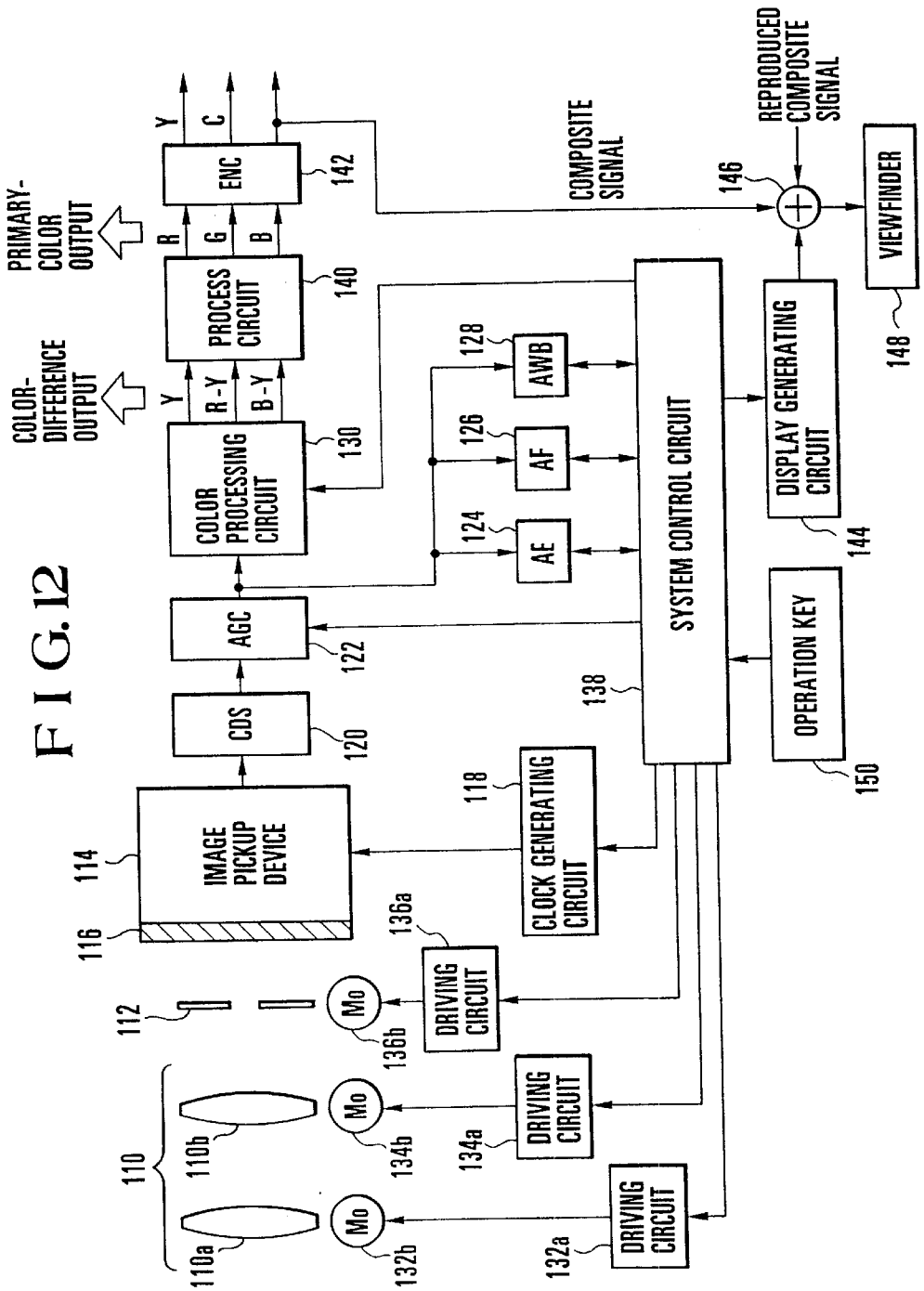
FIG. 12 is a schematic block diagram of the arrangement of the video camera shown in FIG. 6.

If photographic image information is digitally processed in the camera shown in FIG. 12, each output signal may of course be outputted in digital form. If analog outputs are needed, a D/A converter and a band-limiting low-pass filter may be provided at suitable locations.

The compression processing performed in the compression circuit 66 shown in FIG. 6 will be described below in brief. Compression of an image is to reduce the amount of data by removing the redundancy of the image. Compression of a still image utilizes the spatial redundancy of the image. Compression of a moving image utilizes its temporal redundancy in addition to its spatial redundancy, but the basic principles are based on still image compression techniques.

The element techniques of moving-image compression which conforms to, for example, the MPEG (Moving Picture Expert Group) standard, are DCT (discrete cosine transform) processing, quantization processing, coding processing and motion adaptation processing. Expansion can be regarded as the inverse process of compression. The DCT (discrete cosine transform) processing, the quantization processing and the coding processing are common to both the moving-image compression and still-image compression. These techniques will be described below in brief in that order.

DCT converts spatial coordinates into frequencies. As the pre-processing of compression, an input picture is blocked into a pixel group of approximately 8×8 pixels. Multiplication processing using DCT coefficients is performed in units of blocks, whereby space data are converted into frequency data. Although the amount of data is not reduced by DCT alone, it is possible to concentrate data which is widely dispersed in the picture. In other words, an image has a general tendency for more energy to concentrate on a lower spatial frequency side, and DCT performs the function of increasing a compression ratio for substantial compression processing to be executed at the succeeding stages.

The quantization processing rounds off the word lengths of coefficients which have been converted into frequencies by the DCT processing, thereby reducing the amount of data. For example, a data coefficient indicative of each frequency component produced by DCT is divided by an appropriate value, and the figures below the decimal point of the resultant value are omitted. By omitting the figures below the decimal point, it is possible to reduce the number of bits which are required to represent each coefficient data, whereby the total amount of data can be reduced. By setting a divisor for each frequency component, it is possible to increase the compression ratio while retaining the required image quality.

The coding processing assigns to each data a length code corresponding to the occurrence frequency of the data. First, a zigzag scan of the quantized data is performed to convert a two-dimensional data array into a unidimensional data string. The two-dimensional data array is scanned in a zigzag manner from a DC component toward horizontal and vertical higher-frequency components, whereby the data is rearranged. By run length coding, the same numbers (mainly, zeros) which continuously occur are replaced with one code which collectively represents such continuous occurrence. If the data which appear after a particular location are all zeros, an end code is assigned to the data. This code indicates that if it is detected in a block, the transfer of data from the block is brought to an end, and realizes a great, data reduction effect.

By assigning codes of fewer bits to numbers having higher occurrence frequencies, the substantial total number of coding bits can be reduced.

The motion adaptation processing adds the technique of detecting and predicting a motion to still-image compression. The element techniques includes motion detection, motion predictive compensation and interlacing coding. The motion adaptation processing will be described below with illustrative reference to the case of compression of a moving image conforming to a television broadcasting standard.

In the motion detection, image data is delayed by a time which corresponds to an integer multiple of a field (or frame) period, as by a frame memory, and two field (frame) pictures are compared in a time-axis direction, thereby detecting a motion. As well-known motion detecting methods, there are a method of obtaining the amount of motion as the absolute value of the difference in luminance data between pictures and a method of computing the travel of a two-dimensional coordinate point having a highest correlation, thereby detecting a motion vector.

The motion predictive compensation predicts a motion of an image by the detected motion vector and transmits only the difference between a predicted image and an actual image as compensation data. Accordingly, it is possible to reduce the amount of information to be transferred. Specifically, it is possible to reduce prediction errors in the case of images, such as an image which contains a large still-image portion and moves to a small extent, an image which moves moderately and an image which is rectilinearly travelling. Accordingly, a high compression effect can be achieved.

The interlacing coding forms a pixel block for compression processing in units of fields. A television signal, such as an NTSC television signal, has an interlaced structure in which the scanning lines of odd and even fields are alternately disposed. An odd field made up of 262.5 odd lines and an even field made up of 262.5 even lines are paired to form a frame picture made up of 525 lines.

If an odd field and an even field are simply combined when the amount of motion of a subject in a picture is large, a frame image blurs and is visually extremely impaired. In a blurred portion of the picture, a vertical spatial correlation is lowered, so that no high compression ratio can be achieved by compression coding processing. If the amount of motion is small, this problems does not occur.

For this reason, if the amount of motion is small, a pixel block for compression processing is formed within a frame picture, while if the amount of motion is greater than a predetermined amount, a pixel block for compression processing is formed within a field picture.

Figure 13:
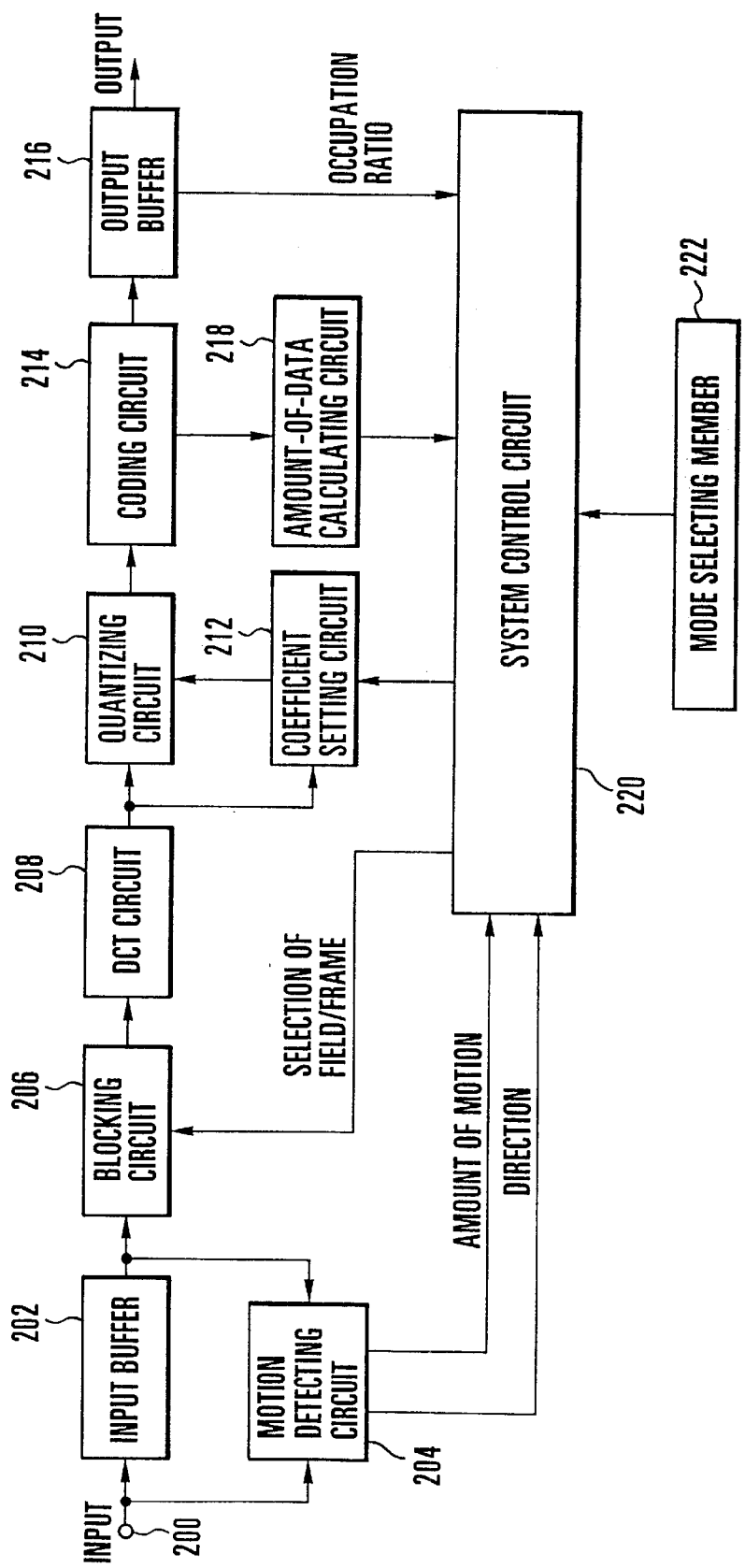
FIG. 13 is a schematic block diagram of the arrangement of an image compressing circuit in the embodiment shown in FIG. 6.

FIG. 13 is a schematic block diagram showing the arrangement of an image compressing circuit which adopts the above-described moving image compression processing techniques. Referring to FIG. 13, an SD or HD signal outputted from the image pickup mode selecting circuit 64 shown in FIG. 6 is inputted through an input terminal 200. The video signal inputted through the input terminal 200 is inputted to an input buffer 202 and a motion detecting circuit 204. The input buffer 202 functions as 1-frame-period delay means, and its output is applied to a blocking circuit 206 and the motion detecting circuit 204.

The motion detecting circuit 204 performs the above-described comparison computation on the video signal supplied from the input terminal 200 and the video signal outputted from the input buffer 202, thereby detecting a motion vector. The motion detecting circuit 204 outputs information indicative of the amount and direction of the motion to a system control circuit 220. On the basis of the motion vector information, the system control circuit 220 determines whether compression processing is to be performed in units of fields or in units of frames, and applies the resultant field/frame selection information to the blocking circuit 206.

Figure 14:
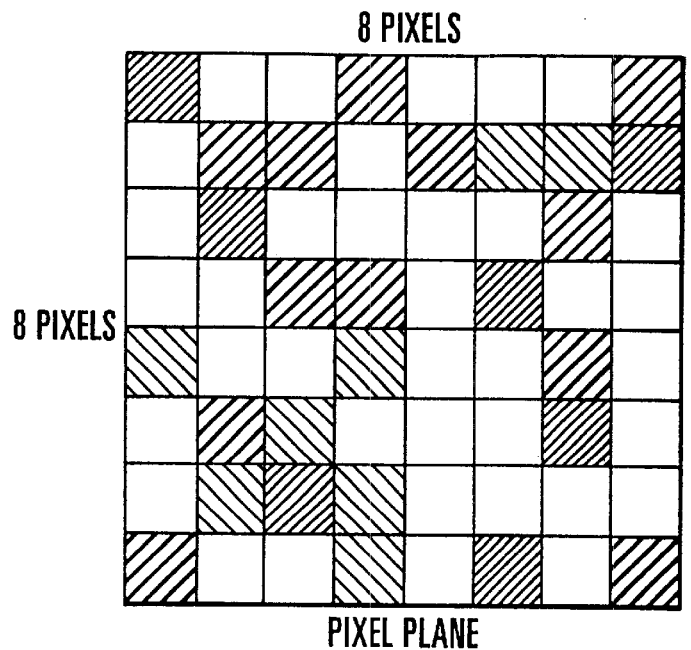
FIG. 14 is an explanatory view of a block formed by the blocking circuit shown in FIG. 13.
Figure 15:
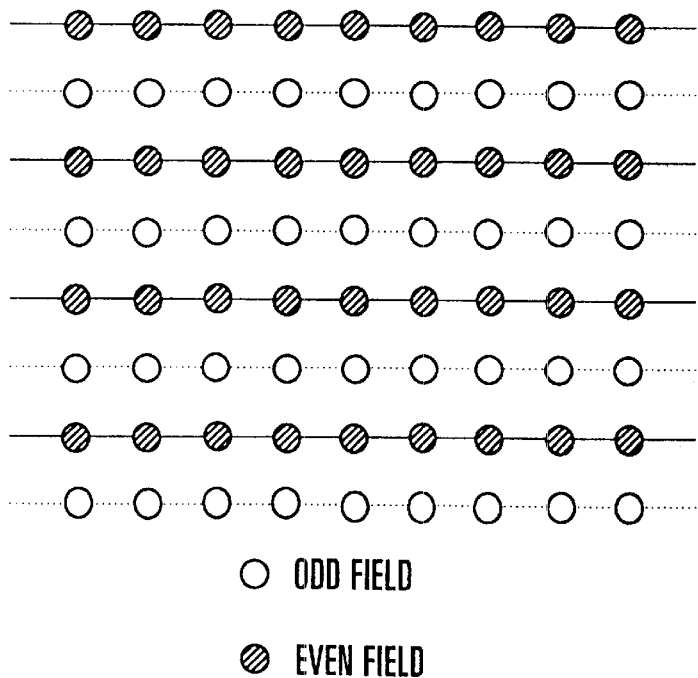
FIG. 15 is an explanatory view of the pixel arrangements of an even field and an odd field.

The blocking circuit 206 blocks the output image of the input buffer 202 into 8 pixels×8 pixels as shown in FIG. 14, in the units of fields or frames according to the field/frame selection signal supplied from the system control circuit 220. FIG. 15 shows the pixel arrangements of odd and even fields within one frame.

Figure 16:
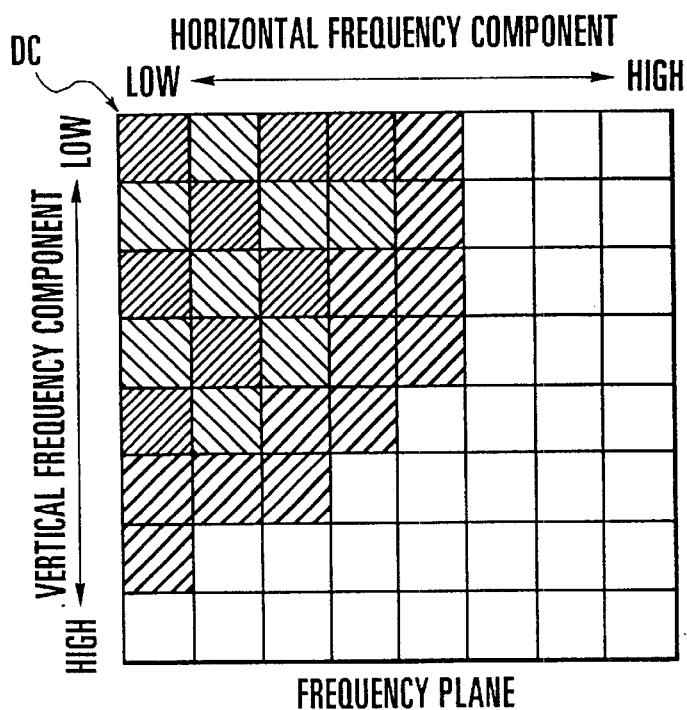
FIG. 16 is an explanatory view of the output of the DCT circuit shown in FIG. 13.

A DCT circuit 208 performs discrete cosine transform of the blocked pixel data supplied from the blocking circuit 206. By this discrete cosine transform, the image data is converted into coefficient data which is represented as a block of 8 pixels×8 pixels in a frequency space as shown in FIG. 16. As the general nature of an image, a DC coefficient and lower-frequency AC components have larger values, while higher-frequency AC components have values close to zero.

The output of the DCT circuit 208 is applied to a quantizing circuit 210 and a coefficient setting circuit 212. The coefficient setting circuit 212 sets a quantizing coefficient for the quantizing circuit 210 in accordance with a control signal supplied from the system control circuit 220 and the output of the DCT circuit 208. The quantizing circuit 210 quantizes the output of the DCT circuit 208 with the quantizing coefficient set by the coefficient setting circuit 212. Specifically, data coefficients for the individual frequency components are divided by adequate divisors, and the figures below the decimal points of the respective results are omitted to reduce the number of bits. Incidentally, the divisors may differ among the individual frequency components.

Figure 17:
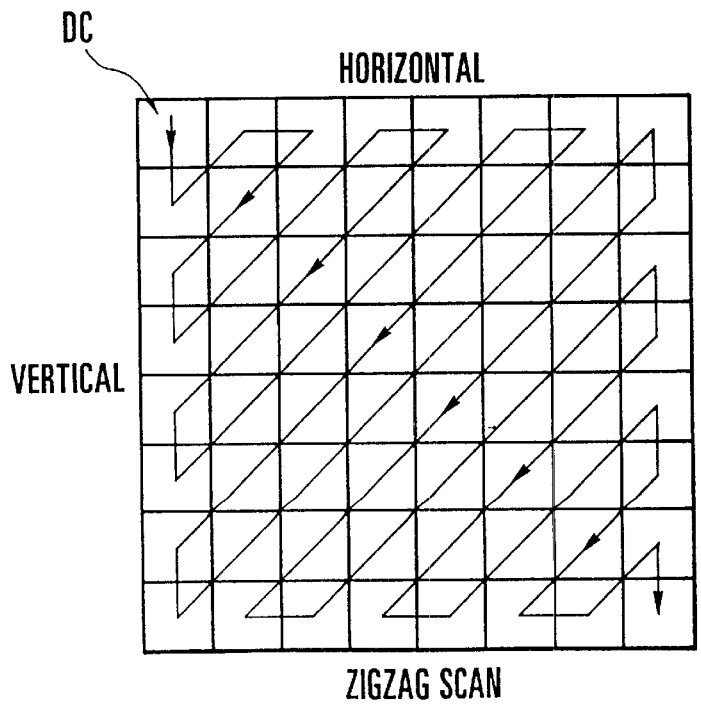
FIG. 17 is an explanatory view of a zigzag scan.

A coding circuit 214 first performs a zigzag scan of the output of the quantizing circuit 210 in the zigzag manner shown in FIG. 17 from a DC component toward horizontal and vertical higher-frequency components as shown in FIG. 17, thereby unidimensionally rearranging the data. After then, the coding circuit 214 replaces continuing zeros with a predetermined code indicative of the number of the continuing zeros by run length coding. As described previously, if all the data which appear after a particular location are zeros, the coding circuit 214 assigns an end code to the data. The coding circuit 214 also assigns a short code to data the occurrence frequency of which is high, by variable length coding. Thus, the amount of data can be greatly reduced.

An amount-of-data calculating circuit 218 calculates the amount of the coded data generated by the coding circuit 214 and supplies the result to the system control circuit 220. The system control circuit 220 causes the coefficient setting circuit 212 to generate a quantizing coefficient which is selected so that the amount of coded data to be generated by the coding circuit 214 becomes a predetermined value.

The output of the coding circuit 214 is supplied to an output buffer 216. The output buffer 216 supplies the output of the coding circuit 214 to a rear-stage circuit at a data rate. The output buffer 216 also supplies information indicative of its internal data occupation ratio to the system control circuit 220. The system control circuit 220 controls the coefficient setting circuit 212 so that this occupation ratio becomes stable in the neighborhood of a predetermined value in order to prevent an overflow or a data shortage from occurring in the output buffer 216. Specifically, if the data occupation ratio is high, the system control circuit 220 causes the coefficient setting circuit 212 to set a large coefficient (divisor), whereas if the data occupation ratio is low, the system control circuit 220 causes the coefficient setting circuit 212 to set a small coefficient (divisor).

In the arrangement shown in FIG. 13, the system control circuit 220 controls the coefficient setting circuit 212 in accordance with the amount of coded data generated by the coding circuit 214 (the output of the amount-of-data calculating circuit 218) and the data occupation ratio of the output buffer 216. An operator can instruct, through a mode selecting member 222, the system control circuit 220 to perform switching among the compression ratios (target values), the compression systems and the like. Of course, the system control circuit 220 can adaptively control the compression ratios (target values), the compression systems and the like in accordance with the result of the detection of a motion of an image and an operation mode set by the mode selecting member 222, whereby it is possible to efficiently compress a moving image. As a matter of course, by changing the coefficient to be set by the coefficient setting circuit 212, it is also possible to vary the compression ratio.

Figure 18:
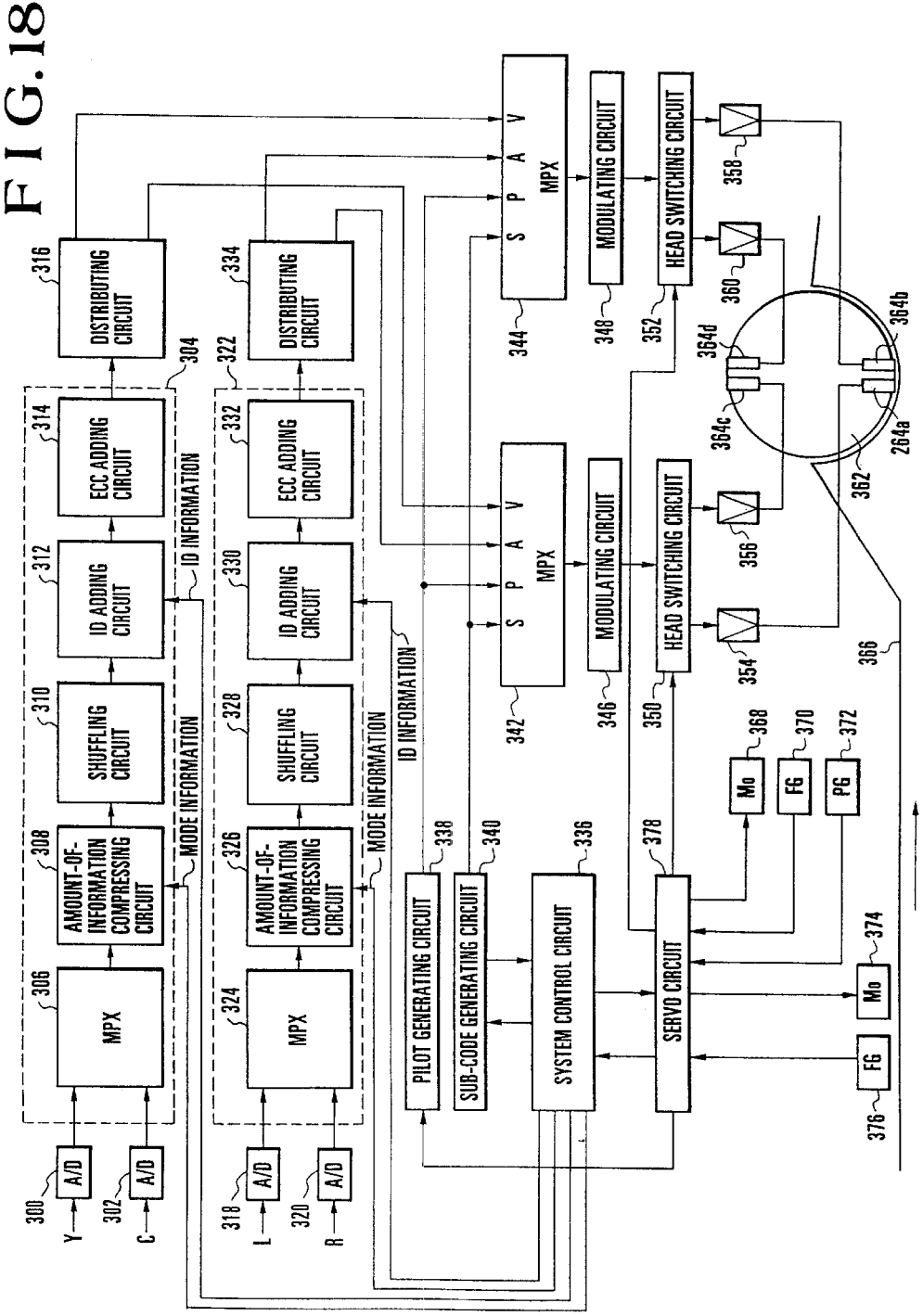
FIG. 18 is a schematic block diagram of the arrangement of the recording system of a digital video tape recorder.

The recording system for recording a signal supplied from the camera system of FIG. 12 will be described below in detail. FIG. 18 is a detailed block diagram showing the arrangement of the recording system. In the shown arrangement, a system control circuit 336 is substantially identical to the system control circuit 138 of the camera system.

An A/D converter 300 converts the luminance signal Y into a digital signal, while an A/D converter 302 converts the chrominance signal C into a digital signal. The luminance signal Y and the chrominance signal C are those supplied from the camera system described previously with reference to FIG. 12. Of course, if digital processing is already performed in the camera system, neither of the A/D converters 300 and 302 is needed.

A multiplexer 306 of a video data processing circuit 304 multiplexes the outputs of the A/D converters 300 and 302 and outputs the multiplexed data to an amount-of-information compressing circuit 308. The amount-of-information compressing circuit 308 compresses the multiplexed data by using a compression system and a compression ratio according to mode information supplied from the system control circuit 336. The amount-of-information compressing circuit 308 is substantially identical to the circuit described above with reference to FIG. 13. Of course, it is also possible to adopt a circuit arrangement for individually compressing the amounts of information of luminance data and chrominance data without multiplexing these data in the multiplexer 306.

A shuffling circuit 310 rearranges the output data string of the amount-of-information compressing circuit 308 in accordance with appropriate rules, thereby preventing a transmission error from easily occurring in the data string. This shuffling operation also has the effect of making uniform the uneven distribution of the amount of information in a picture which is based on the presence of dense and sparse portions in the picture. The execution of the shuffling operation at a stage preceding the compression of the amount of information is convenient for variable length coding, such as run length coding.

An ID adding circuit 312 adds identification (ID) information for restoring the data shuffled by the shuffling circuit 310. This identification information also contains mode information indicative of modes used for recording (the kind of compression system and the like), and is used as auxiliary information for expansion processing during reproduction. An ECC adding circuit 314 adds an error-correcting code to the output data of the ID adding circuit 312.

The video data subjected to the above-described processing in the video data processing circuit 304 is distributed into two channels by a data distributing circuit 316.

An A/D converter 318 converts the L-channel signal of a stereophonic audio signal into a digital signal, while an A/D converter 320 converts the R-channel signal into a digital signal. A multiplexer 324 of an audio data processing circuit 322 multiplexes the outputs of the A/D converters 318 and 320 and outputs the multiplexed data to an amount-of-information compressing circuit 326. The amount-of-information compressing circuit 326 compresses the multiplexed data by using a compression system and a compression ratio according to mode information supplied from the system control circuit 336.

If the recording rate of video data is large, as in the case of an HD signal, audio information may also be recorded on a recording medium without compression.

A shuffling circuit 328 rearranges the output data string of the amount-of-information compressing circuit 326 in accordance with appropriate rules, thereby preventing a transmission error from easily occurring in the data string. An ID adding circuit 330 adds identification (ID) information for restoring the data shuffled by the shuffling circuit 328. This identification information also contains mode information indicative of modes used for recording (the kind of compression system and the like), and is used as auxiliary information for expansion processing during reproduction. An ECC adding circuit 332 adds an error-correcting code to the output data of the ID adding circuit 330.

The audio data subjected to the above-described processing in the audio data processing circuit 322 is distributed into two channels by a data distributing circuit 334.

A pilot generating circuit 338 generates a pilot signal for tracking servo, and a sub-code generating circuit 340 generates auxiliary data to be recorded simultaneously with the video and audio data. Such auxiliary data contains, for example, an address code for searching for a position on a magnetic tape and the indexes of a program to be recorded.

A multiplexer 342 multiplexes one of the channel outputs of each of the data distributing circuits 316 and 334, the pilot signal outputted from the pilot generating circuit 338, and the sub-code data generated by the sub-code generating circuit 340. A multiplexer 344 multiplexes the other channel output of each of the data distributing circuits 316 and 334, the pilot signal outputted from the pilot generating circuit 338, and the sub-code data generated by the sub-code generating circuit 340. In the case of time-base multiplexing, the multiplexing of the pilot signal may be performed in accordance with an area division ATF system which is well known in the field of digital audio tape recorders.

Digital modulating circuits 346 and 348 digitally modulate the respective outputs of the multiplexers 342 and 344 by means of, for example, 8–10 conversion and an NRZI method.

Figure 19:
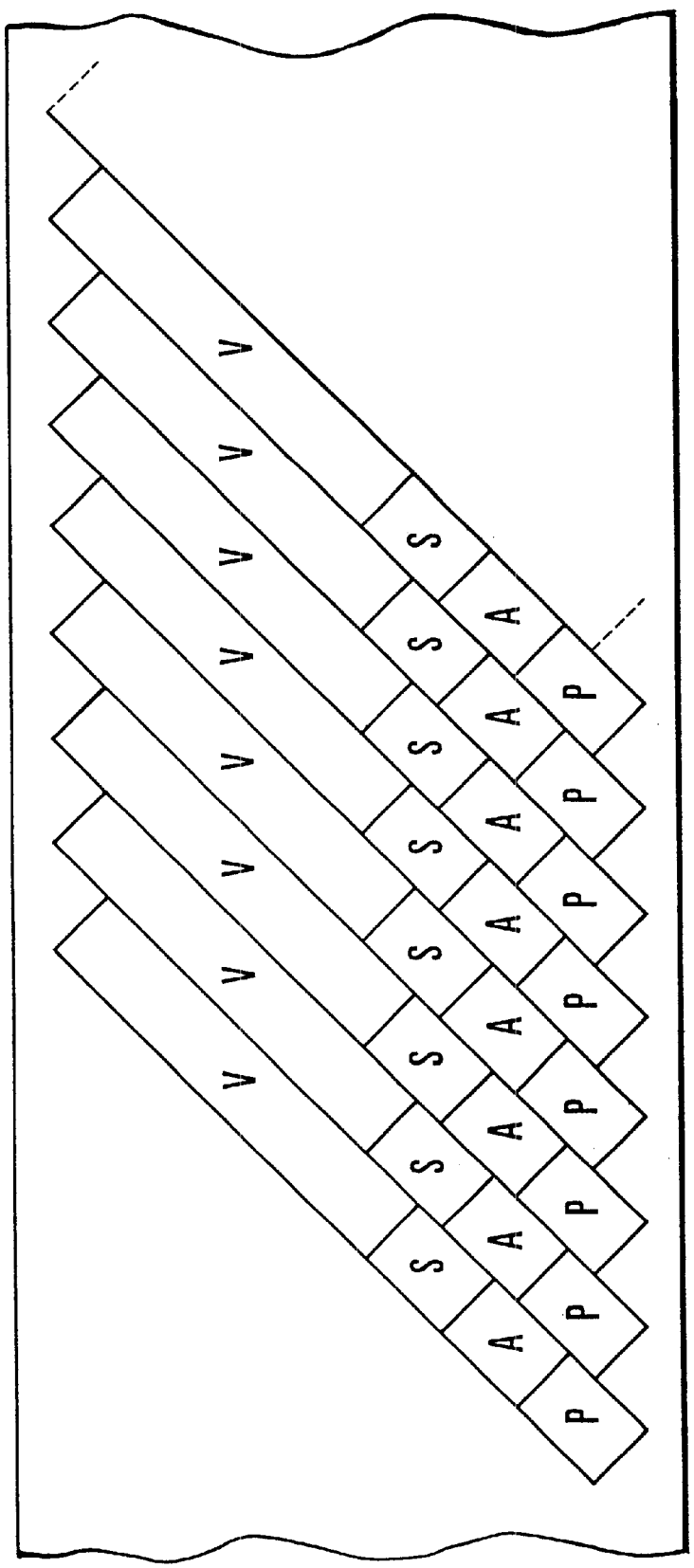
FIG. 19 is a schematic view of a recording track pattern on a magnetic tape.
Figure 20:
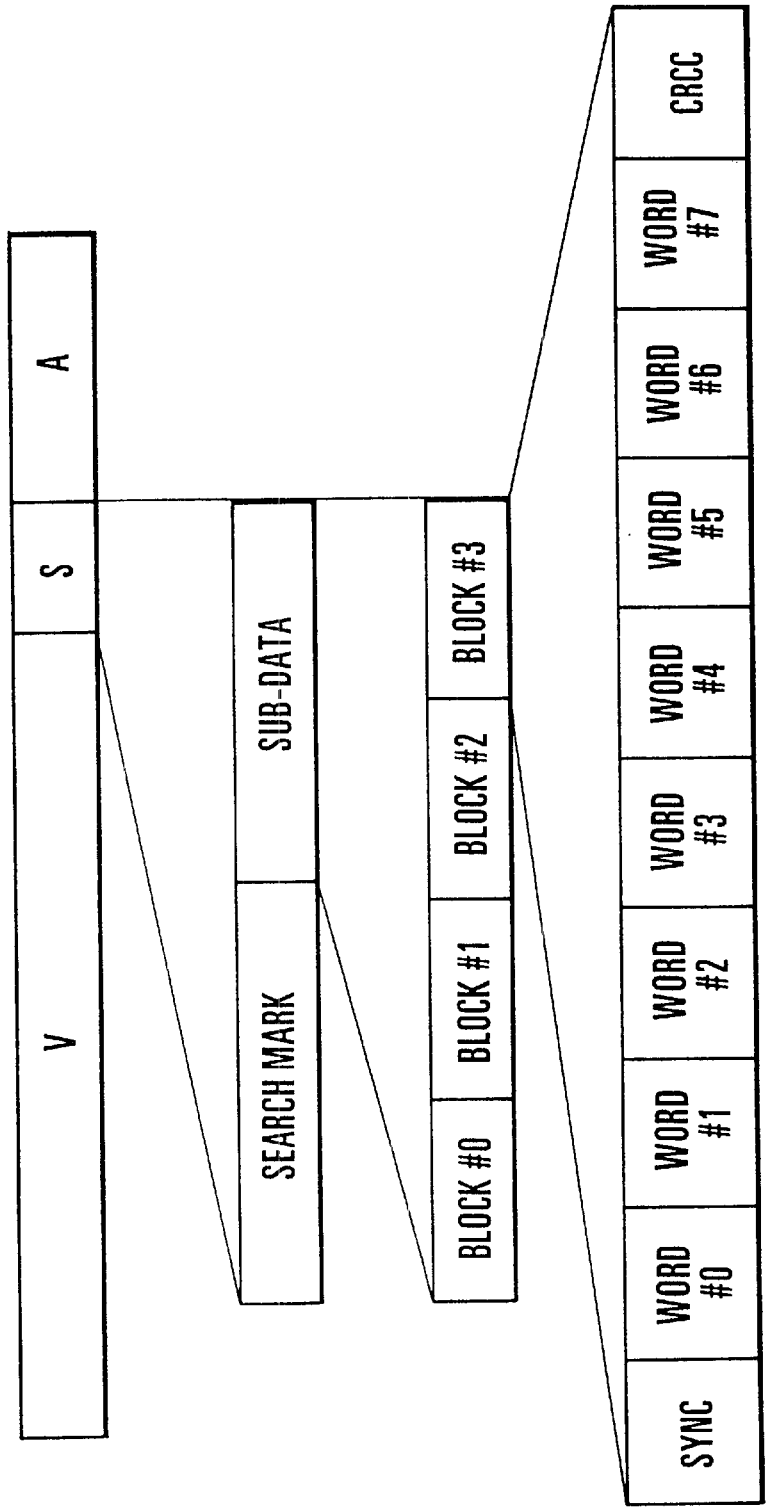
FIG. 20 is a view of the data structure of a sub-code.

The recording system according to the present embodiment is provided with two pairs of magnetic heads. A head switching circuit 350 switches the output of the modulating circuit 346 between recording amplifiers 354 and 356 in accordance with a control signal supplied from a servo circuit 378. A head switching circuit 352 switches the output of the modulating circuit 348 between recording amplifiers 358 and 360 in accordance with a control signal supplied from the servo circuit 378. The outputs of the recording amplifiers 354, 356, 358 and 360 are respectively applied to magnetic heads 364a, 364c, 364b and 364d of a rotary drum 362, whereby they are recorded on a magnetic tape 366. FIG. 19 shows one example of the track pattern of the magnetic tape 366. Each of the tracks contains a pilot signal P, audio data A, sub-code S and video data V. FIG. 20 shows the detailed data structure of the sub-code S.

The servo circuit 378 controls the rotation of the rotary drum 362 and the running of the magnetic tape 366 as well as the head switching operations of the head switching circuits 350 and 352. Specifically, a rotation detector (FG) 376 for detecting the rotation of a capstan motor 374 for causing the magnetic tape 366 to run is connected to the capstan motor 374, and the servo circuit 378 controls, according to the output of the rotation detector (FG) 376, the capstan motor 374 to cause it to rotate at a predetermined rotational speed.

Also, a drum motor 368 rotates the rotary drum 362, a rotation detector (FG) 370 detects the rotational speed of the drum motor 368, and a rotational phase detector (PG) 372 detects the rotational phase of the rotary drum 362. The servo circuit 378 drives, according to the outputs of the rotation detector (FG) 370 and the rotational phase detector (PG) 372, the drum motor 368 to cause the rotary drum 362 to rotate at a predetermined rotational speed. The servo circuit 378 also controls the head switching operations of the head switching circuits 350 and 352 in accordance with the output of the rotational phase detector (PG) 372.

The system control circuit 336 controls the entire recording system in accordance with an instruction inputted through an operation panel (not shown) and on the basis of the operating state of each part.

The functions of the system control circuit 336 and the servo circuit 378 are realized by one microcomputer chip.

Figure 21:
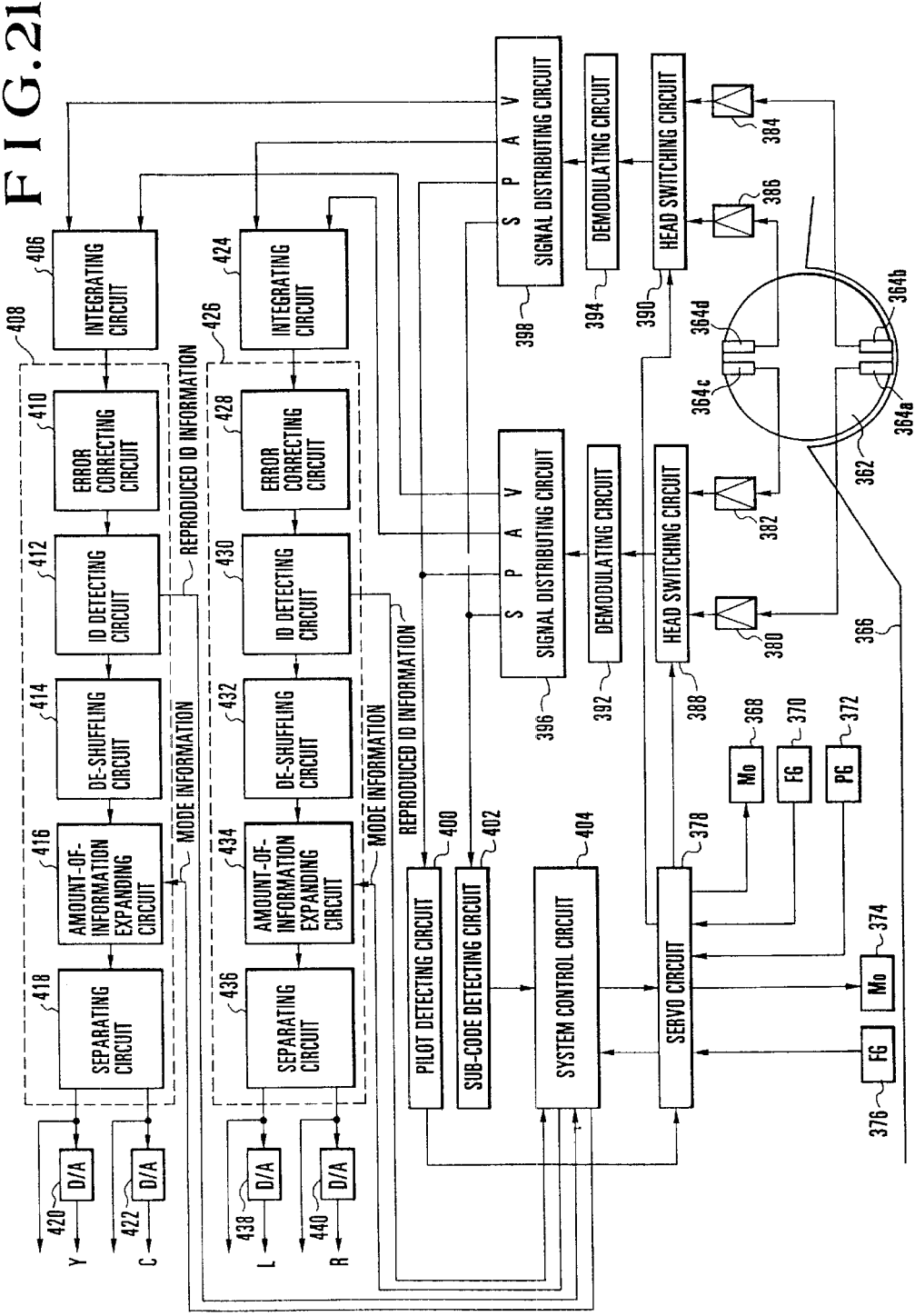
FIG. 21 is a schematic block diagram of the arrangement of the reproducing system of the digital video tape recorder.

The reproducing system will be described below in detail with reference to FIG. 21. In FIG. 21, identical reference numerals are used to denote constituent elements identical to those shown in FIG. 18. Specifically, in a manner similar to the recording operation, the servo circuit 378 causes the magnetic tape 366 to run at a predetermined speed by means of the capstan motor 374 as well as causes the rotary drum 362 to rotate at a predetermined rotational speed and in a predetermined rotational phase by means of the capstan motor 374.

The outputs of the magnetic heads 364a, 364c, 364b and 364d are respectively amplified by reproducing amplifiers 380, 382, 384 and 386, and the outputs of the reproducing amplifiers 380, 382 and 384, 386 are respectively applied to head switching circuits 388 and 390. In accordance with control signals supplied from the servo circuit 378, the head switching circuit 388 switches the outputs of the reproducing amplifiers 380 and 382 therebetween, while the head switching circuit 390 switches the outputs of the reproducing amplifiers 384 and 386 therebetween. Demodulating circuits 392 and 394 respectively digitally demodulate the outputs of the head switching circuits 388 and 390 by a redundancy detecting method, such as a differential detecting method, an integral detecting method or Viterbi decoding, and output two-level signals. Each of the outputs of the demodulating circuits 392 and 394 is made of information which includes video information, audio information, a pilot signal and sub-code information in a time division multiplexed state.

Signal distributing circuits 396 and 398 supply the respective outputs of the demodulating circuits 392 and 394 to predetermined circuits: that is to say, the video information is supplied to a data integrating circuit 406, the audio information is supplied to a data integrating circuit 424, the pilot signals are supplied to a pilot detecting circuit 400, and the sub-code information is supplied to a sub-code detecting circuit 402.

The pilot detecting circuit 400 detects as an error signal the time difference between the pilot signal and a timing reference signal corresponding to an off-track amount relative to the right and left tracks, and supplies the error signal to the servo circuit 378. The servo circuit 378 adjusts a tape transporting speed in accordance with the error signal. The error signal can also be used as auxiliary information for identification of a recording mode.

A sub-code detecting circuit 402 decodes the content of the sub-code from each of the S outputs of the signal distributing circuits 396 and 398, and supplies the result to a system control circuit 404. The system control circuits 404 controls each part in accordance with the content of the reproduced sub-code.

The data integrating circuit 406 integrates the video information supplied from the signal distributing circuits 396 and 398 via two lines, and outputs the integrated video information to a video data reproducing circuit 408.

In the video data reproducing circuit 408, an error correcting circuit 410 corrects an error which has occurred during recording or reproduction. If the error cannot be corrected, the error correcting circuit 410 performs correction of the error by using interpolation. An ID detecting circuit 412 detects the ID added by the ID adding circuit 312 during recording, and supplies the ID to the system control circuit 404. A de-shuffling circuit 414 restores the data string rearranged by the shuffling circuit 310, and an amount-of-information expanding circuit 416 expands the data compressed by the amount-of-information compressing circuit 308, in accordance with the mode information supplied from the system control circuit 404, thereby restoring the original image data. A data separating circuit 418 separates the original image data into luminance data and chrominance data and supplies the respective data to D/A converters 420 and 422. The data separating circuit 418 also outputs the digital image data to the outside.

The D/A converter 420 converts the luminance data into an analog signal, while the D/A converter 422 converts the chrominance data into an analog chrominance signal. The analog signals are both outputted to the outside, and are also converted into a composite signal, which is inputted to the adder 146 of FIG. 12. An operator can view a reproduced image in the electronic viewfinder 148.

The data integrating circuit 424 integrates the audio information supplied from the signal distributing circuits 396 and 398 via two lines, and outputs the integrated audio information to an audio data reproducing circuit 426.

In the audio data reproducing circuit 426, an error correcting circuit 428 corrects an error which has occurred during recording or reproduction. If the error cannot be corrected, the error correcting circuit 428 performs correction of the error by using interpolation. An ID detecting circuit 430 detects the ID added by the ID adding circuit 330 during recording, and supplies the ID to the system control circuit 404. A de-shuffling circuit 432 restores the data string rearranged by the shuffling circuit 328, and an amount-of-information expanding circuit 434 expands the data compressed by the amount-of-information compressing circuit 326, in accordance with the mode information supplied from the system control circuit 404, thereby restoring the original audio data. A data separating circuit 436 separates the original audio data into L-channel audio data and R-channel audio data and supplies the respective data to D/A converters 438 and 440. The data separating circuit 436 can also output the digital audio data to the outside.

The D/A converter 438 converts the L-channel audio data into an analog signal, while the D/A converter 440 converts the R-channel audio data into an analog signal. The analog signals are both outputted to the outside.

As described previously, the present embodiment is provided with the three modes: the HD mode, the SD-High mode and the SD-Low mode. Since recording track patterns differ among the three modes, mode identification information is recorded in sub-code areas so that reproduction from tracks can be correctly performed in the case of any of the three modes. The recording track patterns and mode identification methods for the respective modes will be described below. FIG. 22 shows magnetic tape running speeds, the number of tracks per field and compression ratios for the respective modes.

Figure 23:
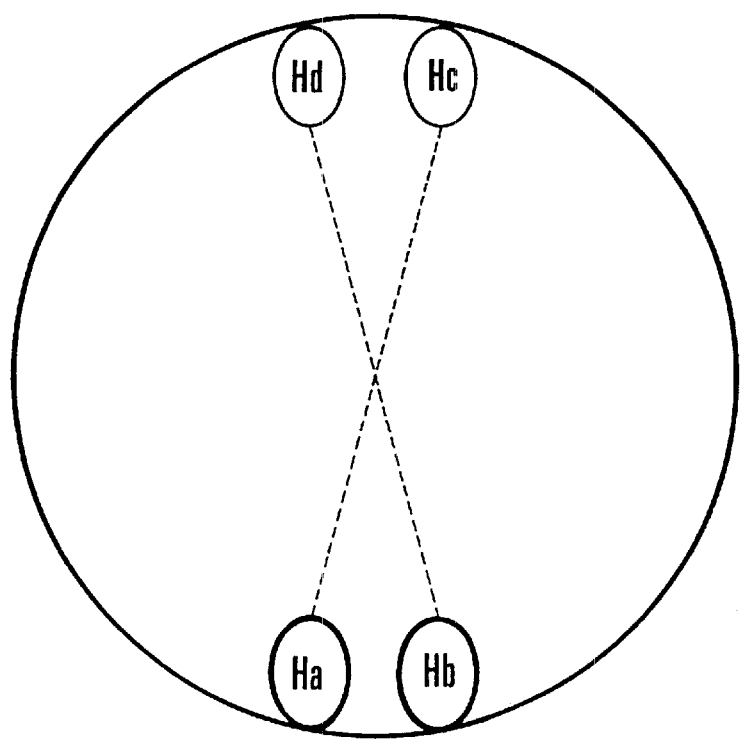
FIG. 23 is a schematic view showing a head for use in an SD-Low mode.
Figure 24:
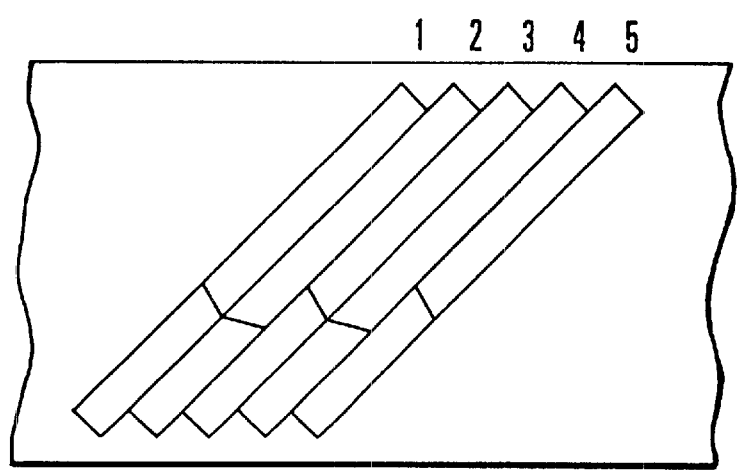
FIG. 24 is a schematic view showing tracks for one field in the SD-Low mode.
Figure 25:
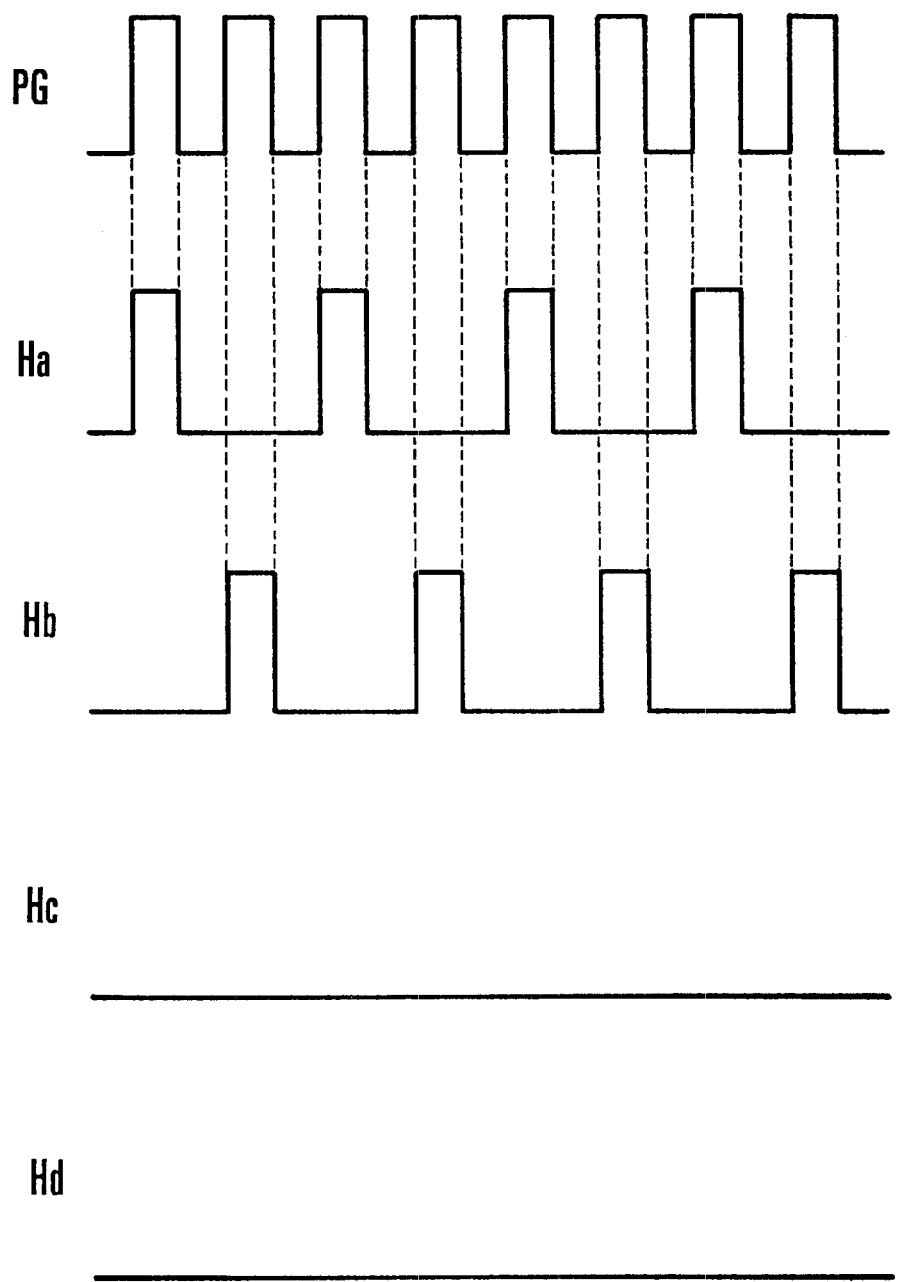
FIG. 25 is a chart showing the timing of head switching which is performed in the SD-Low mode.

The SD-Low mode serves as a long-time recording mode for the SD signal. Out of the four magnetic heads Ha, Hb, Hc and Hd shown in FIG. 23, only the magnetic heads Ha and Hb are used, and five tracks per field are formed as shown in FIG. 24. FIG. 25 shows the timing of head switching. Recording current is alternately applied to the magnetic heads Ha and Hb each time a drum PG pulse goes high while a rotary drum is being rotated at 150 rps.

Figure 26:
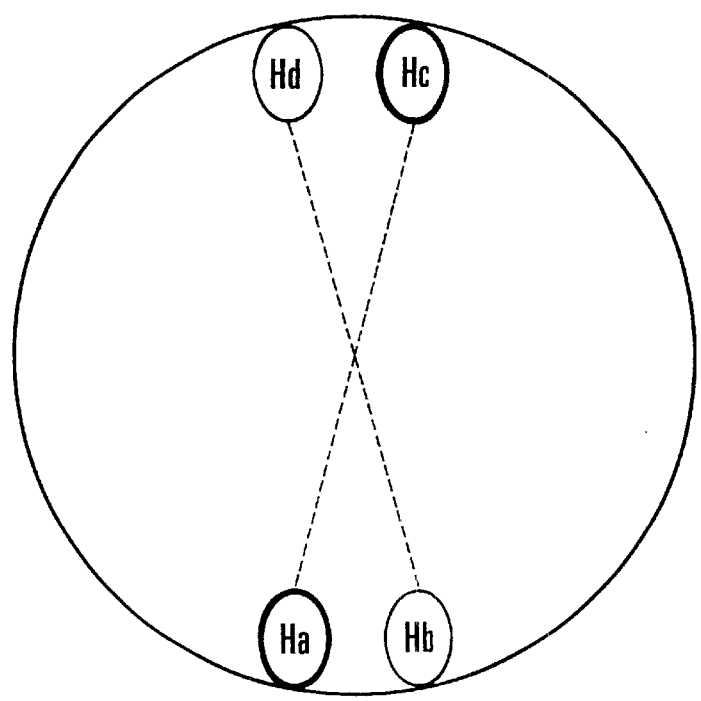
FIG. 26 is a schematic view showing a head for use in an SD-High mode.
Figure 27:
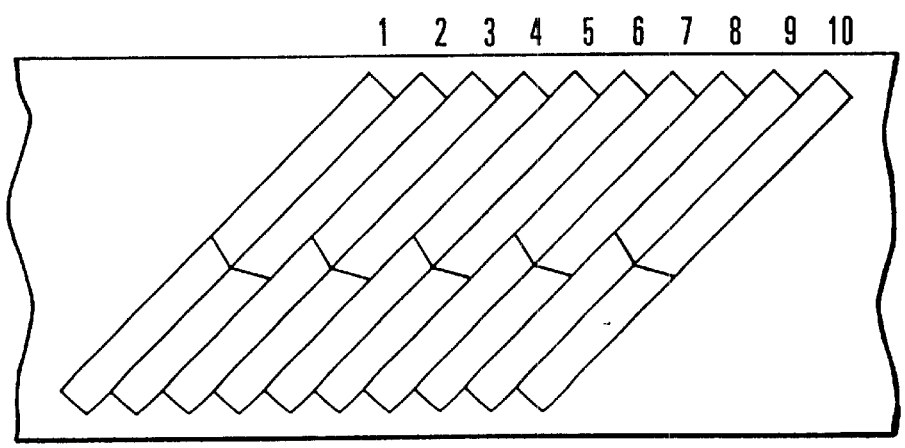
FIG. 27 is a schematic view showing tracks for one field in the SD-High mode.
Figure 28:
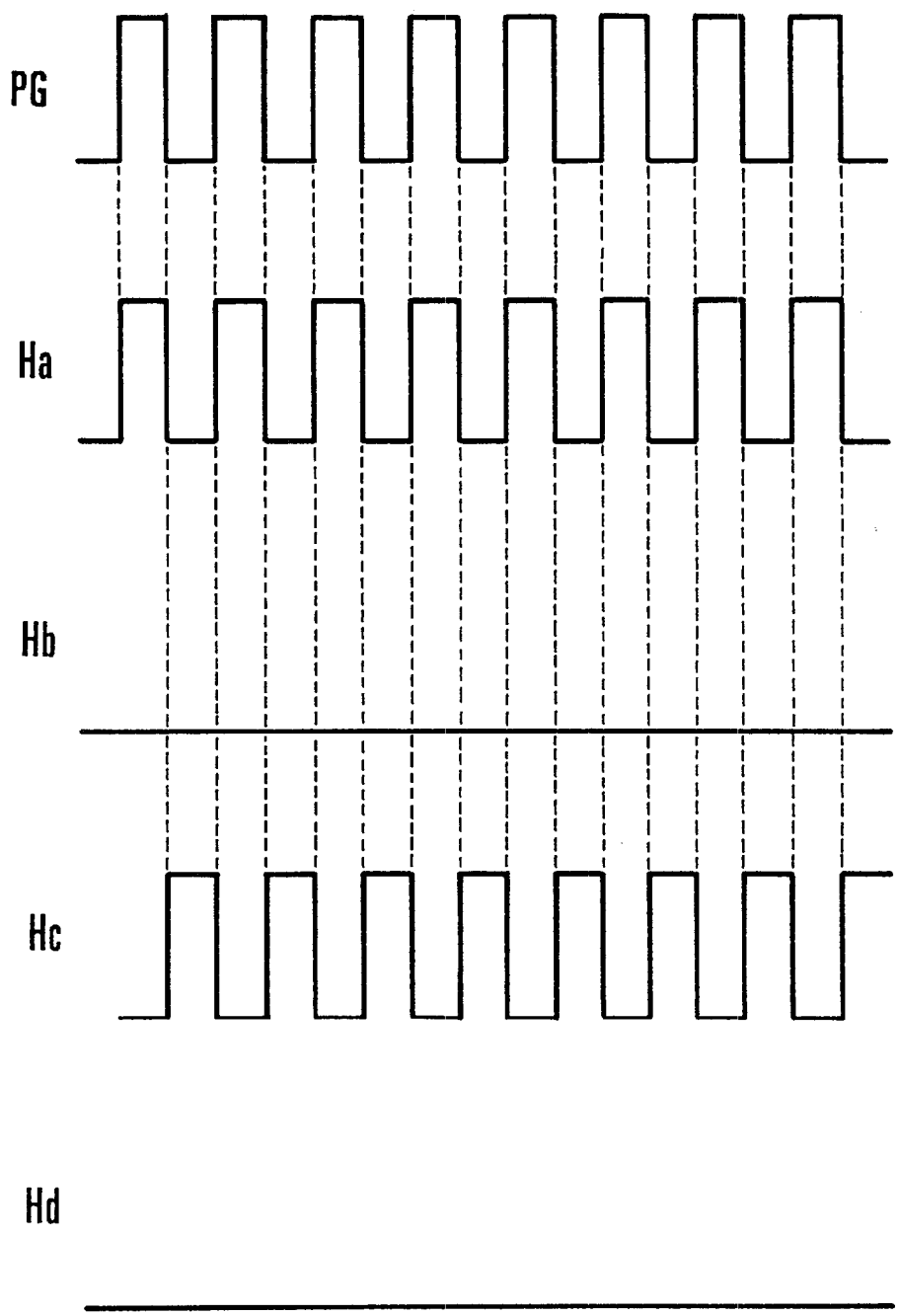
FIG. 28 is a chart showing the timing of head switching which is performed in the SD-High mode.

In the SD-High mode, out of the four magnetic heads Ha, Hb, Hc and Hd shown in FIG. 26, only the magnetic heads Ha and Hc are used, and ten tracks per field are formed as shown in FIG. 27. FIG. 28 shows the timing of head switching. While the rotary drum is being rotated at 150 rps, the recording current is applied to the magnetic head Ha if the drum PG pulse goes high and to the magnetic head Hc if the drum PG pulse goes low.

Figure 29:
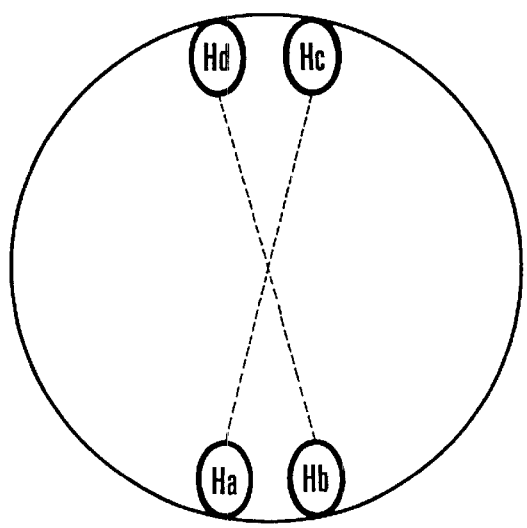
FIG. 29 is a schematic view showing a head for use in an HD mode.
Figure 30:
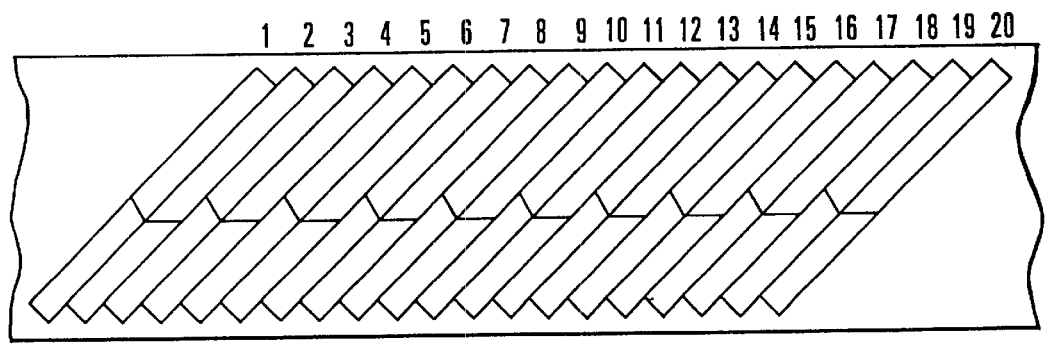
FIG. 30 is a schematic view showing tracks for one field in the HD mode.
Figure 31:
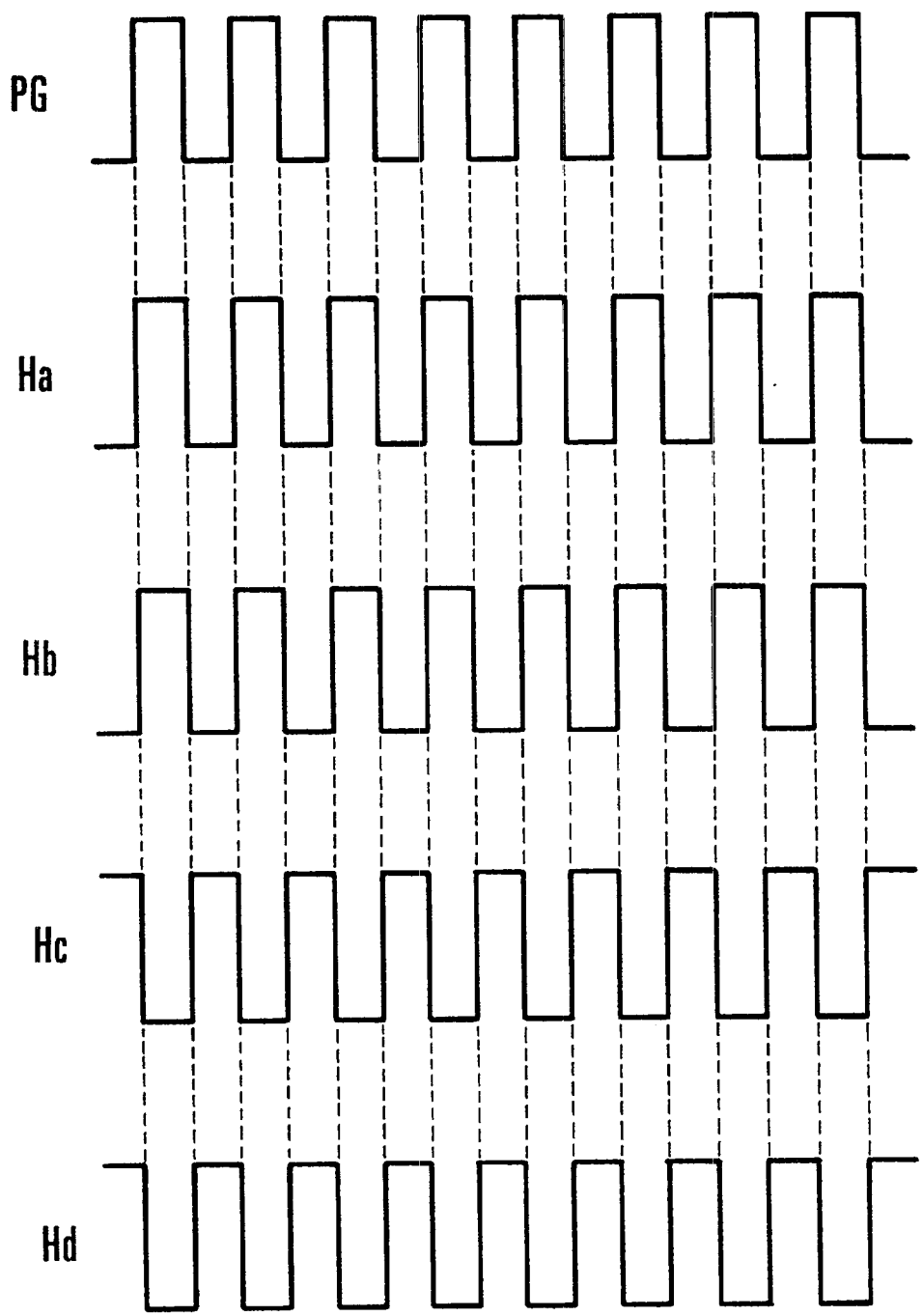
FIG. 31 is a chart showing the timing of head switching which is performed in the HD mode.

In the HD mode, all the four magnetic heads Ha, Hb, Hc and Hd shown in FIG. 29 are used, and twenty tracks per field are formed as shown in FIG. 30. FIG. 31 shows the timing of head switching. While the rotary drum is being rotated at 150 rps, the recording current is applied to the magnetic heads Ha and Hb if the drum PG pulse goes high and to the magnetic heads Hc and Hd if the drum PG pulse goes low.

Figure 32:
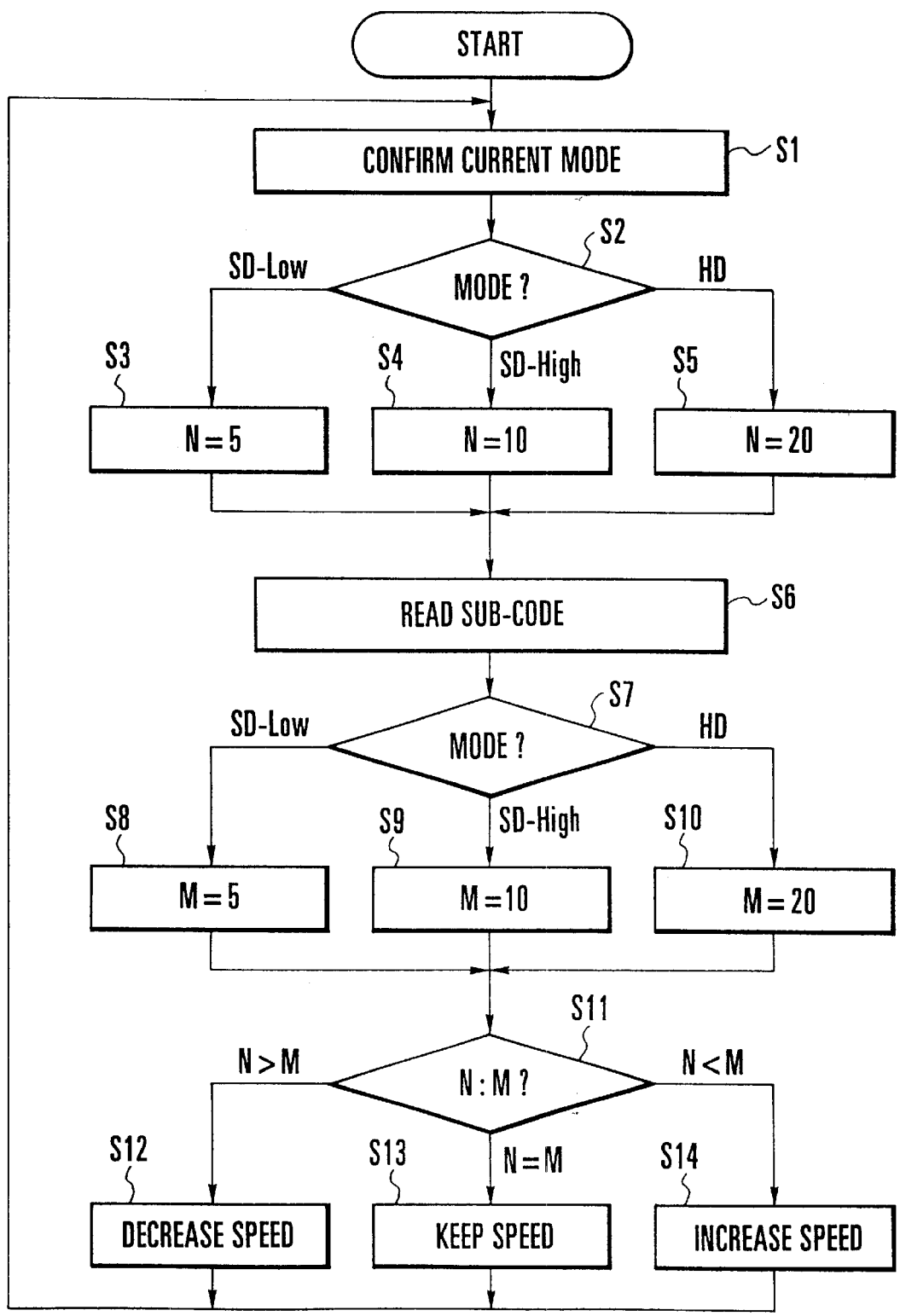
FIG. 32 is a flowchart of mode identification during reproduction.

FIG. 32 shows a flowchart of mode identification which is executed during reproduction. First, the current reproduction mode is confirmed (S1). In Step S2, the flow proceeds to any one of Steps S3, S4 and S5 in accordance with the result of the confirmation which indicates any one of the SD-Low mode, the SD-High mode and the HD mode. Any value of "5", "10" and "20" is set in a variable N (S2, S4 or S5).

The mode used during recording is identified on the basis of the sub-code of a reproduced digital signal (S6 and S7), and the subsequent reproduction mode is determined. In Step S7, the flow proceeds to any one of Steps S8, S9 and S10 in accordance with the determined mode which is any one of the SD-Low mode, the SD-High mode and the HD mode. Any value of "5", "10" and "20" is set in a variable M which determines the number of tracks per field (S8, S9 or S10).

The variables N and M are compared (S11). If N<M, the running speed of the magnetic tape is increased (S12). If N=M, the running speed of the magnetic tape is kept (S13). If N>M, the running speed of the magnetic tape is increased (S14). In other words, the running speed of the magnetic tape is controlled to become equal to the tape speed specified by a mode selected during recording.

After the completion of Step S12, S13 or S14, the flow returns to Step S1, and the above-described processing is repeated.

Figure 33:
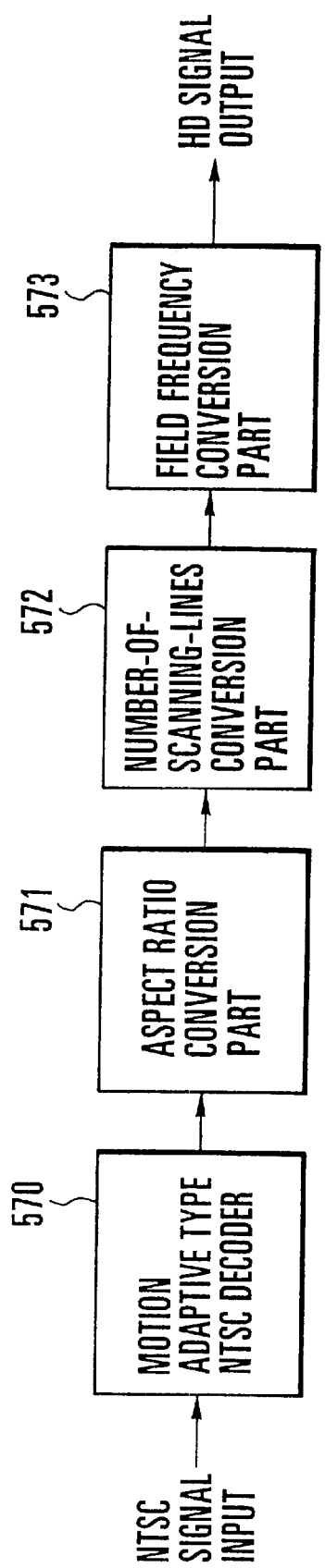
FIG. 33 is a block diagram showing one example of a broadcasting system converter which serves as an up converter.

An embodiment of a video recording and reproducing apparatus in which the down converter shown in FIG. 7 and the up converter shown in FIG. 33 are used as broadcasting system converters will be described below with reference to FIG. 34 as well.

FIG. 33 shows one example of an NTSC-HD system converter which serves as the up converter. In the NTSC-HD system converter shown in FIG. 33, an NTSC signal is decoded through a motion adaptive type NTSC decoder 570, and the aspect ratio of the decoded signal is converted from 4:3 to 16:9 in an aspect ratio conversion part 571. Then, the number of scanning lines is converted from 525 to 1,125 in a number-of-scanning-lines conversion part 572, and the field frequency is converted from 59.94 Hz to 60 Hz in a field frequency conversion part 573. Thus, the NTSC signal is converted into an HD signal to be outputted.

Figure 34:
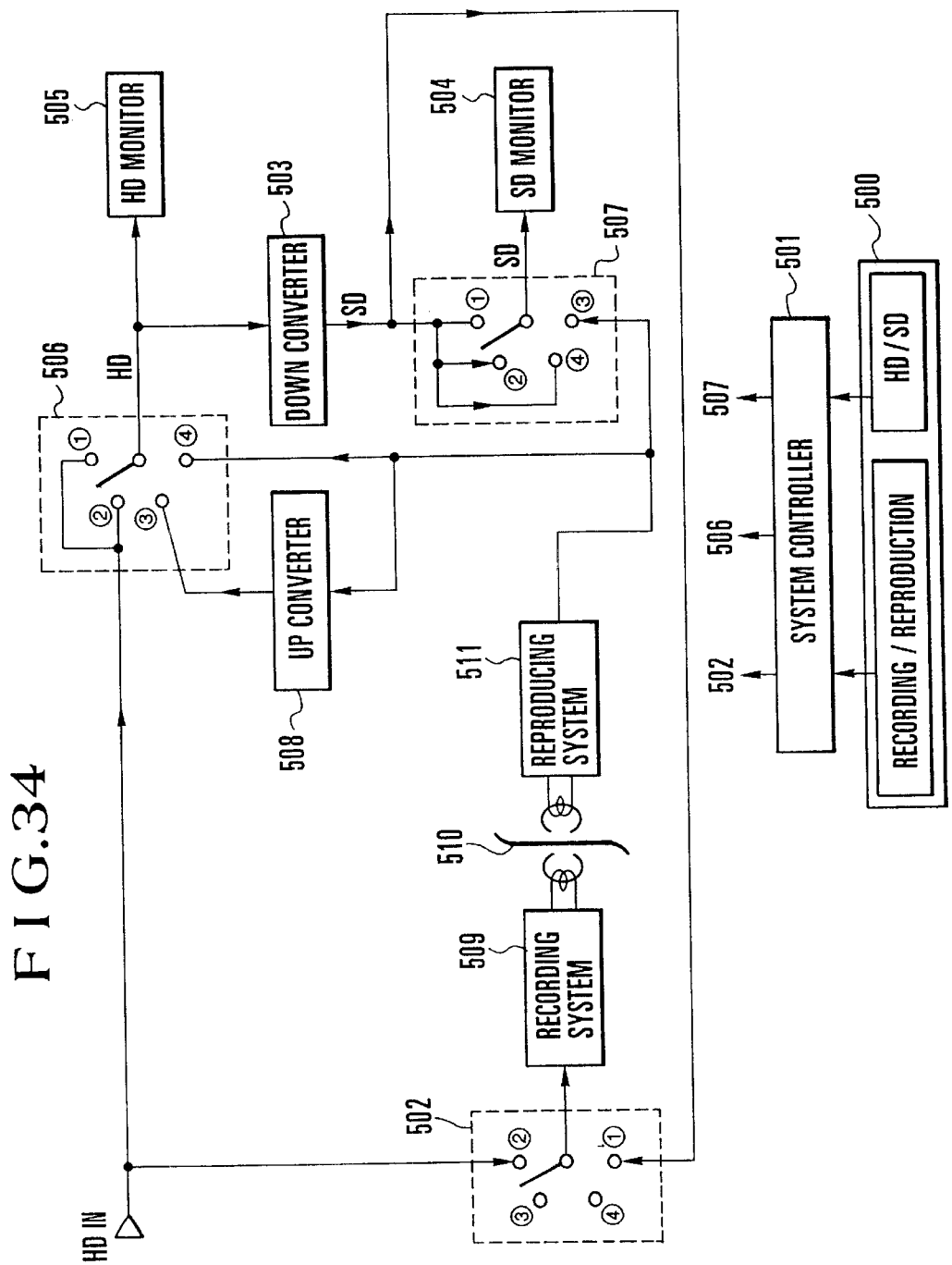
FIG. 34 is a schematic block diagram showing a video recording and reproducing apparatus according to another embodiment of the present invention.

FIG. 34 is a block diagram showing a video recording and reproducing apparatus according to another embodiment of the present invention. An operator can select recording or reproduction, HD mode or SD mode and the like on an operation panel 500. The following description refers to four kinds of operations of the recording and reproducing system of the apparatus. The input signal of this embodiment is an HD signal.

(1) Recording in SD Mode (Long-Time Recording Mode)

"RECORDING" and "SD" are selected on the operation panel 500, and a system controller 501 connects the movable contact of a switch 506 to a contact ① or ② thereof. An HD input signal is down-converted into an SD (for example, NTSC) signal by a down converter 503. The system controller 501 also controls a switch 502 to connect the movable contact of the switch 502 to a contact ① thereof. Thus, the SD signal is recorded on a tape 510 through a recording system 509. During this time, an SD monitor 504 is used.

(2) Recording in HD Mode (High Definition Mode)

"RECORDING" and "HD" are selected on the operation panel 500, and the system controller 501 connects the movable contact of the switch 502 to a contact ② thereof. The HD input signal is directly recorded on the tape 510. During this time, either one of an HD monitor 505 and the SD monitor 504 can be selected.

If the HD monitor 505 is to be used, the movable contact of the switch 506 is connected to the contact ① or ② thereof so that the HD signal can be directly outputted to the HD monitor 505.

If the SD monitor 504 is to be used, the movable contact of the switch 506 is similarly connected to the contact ① or ② thereof, and the HD signal is down-converted into an SD signal by the down converter 503. By connecting the movable contact of the switch 507 to any one selected from the contacts ①, ② and ④ thereof, the SD signal can be outputted to the SD monitor 504.

By adopting the above-described arrangement, it is possible to provide a camera-integrated type VTR of reduced size.

(3) Reproduction in SD Mode

"REPRODUCTION" and "SD" are selected on the operation panel 500, and the system controller 501 connects the movable contact of the switch 507 to a contact ③ thereof. An SD signal reproduced from the tape 510 by a reproducing system 511 is displayed on the SD monitor 504 as a reproduced output image. If the SD signal is to be displayed on the HD monitor 505, it is converted into an HD signal by an up converter 508 and the movable contact of the switch 506 is connected to a contact ③ thereof.

(4) Reproduction in HD Mode

"REPRODUCTION" and "HD" are selected on the operation panel 500, and the system controller 501 connects the movable contact of the switch 506 to a contact ④ thereof. A reproduced HD signal is directly displayed on the HD monitor 505 as a reproduced output image. If the HD signal is to be displayed on the SD monitor 504, the movable contact of the switch 506 is similarly connected to the contact ④ and the HD signal is converted into an SD signal by the down converter 503. When the movable contact of the switch 507 is connected to a contact ① thereof, the SD signal can be displayed on the SD monitor 504. The following table shows the manner of connection of the contacts ① to ④ of each of the switches 502, 506 and 507 during each of the SD and HD modes.

|    | Recording | Reproduction |
|----|-----------|--------------|
| SD | ①         | ③            |
| HD | ②         | ④            |

Although in the above-described embodiment the up converter 508 is employed, a multi-scan monitor may also be used instead of the HD monitor 505. In the case of the multi-scan monitor, the up converter 508 can be omitted because if an SD (for example, NTSC) signal is inputted, the SD signal is scanned by using 525 scanning lines/frame. As the SD-Low mode, an SD signal having a horizontal resolution of approximately 230 lines which is a standard image quality in general domestic apparatus may also be applied to the multi-scan monitor.

As can be readily understood from the above description, in accordance with the above-described embodiment, since a compression mode suitable for image compression processing to be executed in a recording system is selected according to a photographic mode selected in a image pickup system, a photographic image can be efficiently compressed by the image compression processing, so that good image quality and a high compression ratio can be achieved.

Further, in accordance with the above-described embodiment, in one camera-integrated type VTR, it is possible to achieve selective utilization of a plurality of camera modes conforming to a plurality of broadcasting systems. Also, the setting of a compression mode, such as the selection of a compression ratio and a compression system for an image, and the setting of the required recording mode in a VTR can be automatically controlled by a system controller in accordance with the selection of a camera mode. Accordingly, it is possible to realize a camera-integrated type VTR which can be utilized in a variety of applications by an easy operation without the need to perform a complicated connection or operation.

Also, in accordance with the above-described embodiment, since a single down converter is used to perform recording of a video signal input and reproduction of a recorded video signal, it is possible to reduce the circuit scale of the apparatus, and it is also possible to selectively record or reproduce an HD signal and an SD signal. Also, it is possible to employ an SD monitor as an output monitor for an HD signal input. Further, since the SD monitor can be used as a monitor, it is possible to realize a camera-integrated type VTR which is reduced in size compared to conventional camera-integrated type VTRS.

In the above-described embodiment, the HD mode, the SD-Low mode and the SD-High mode are prepared as the three recording modes. However, the kinds of modes are not limited to these modes, and it is also possible to use three modes such as HD, SD and ED modes.

Figure 35:
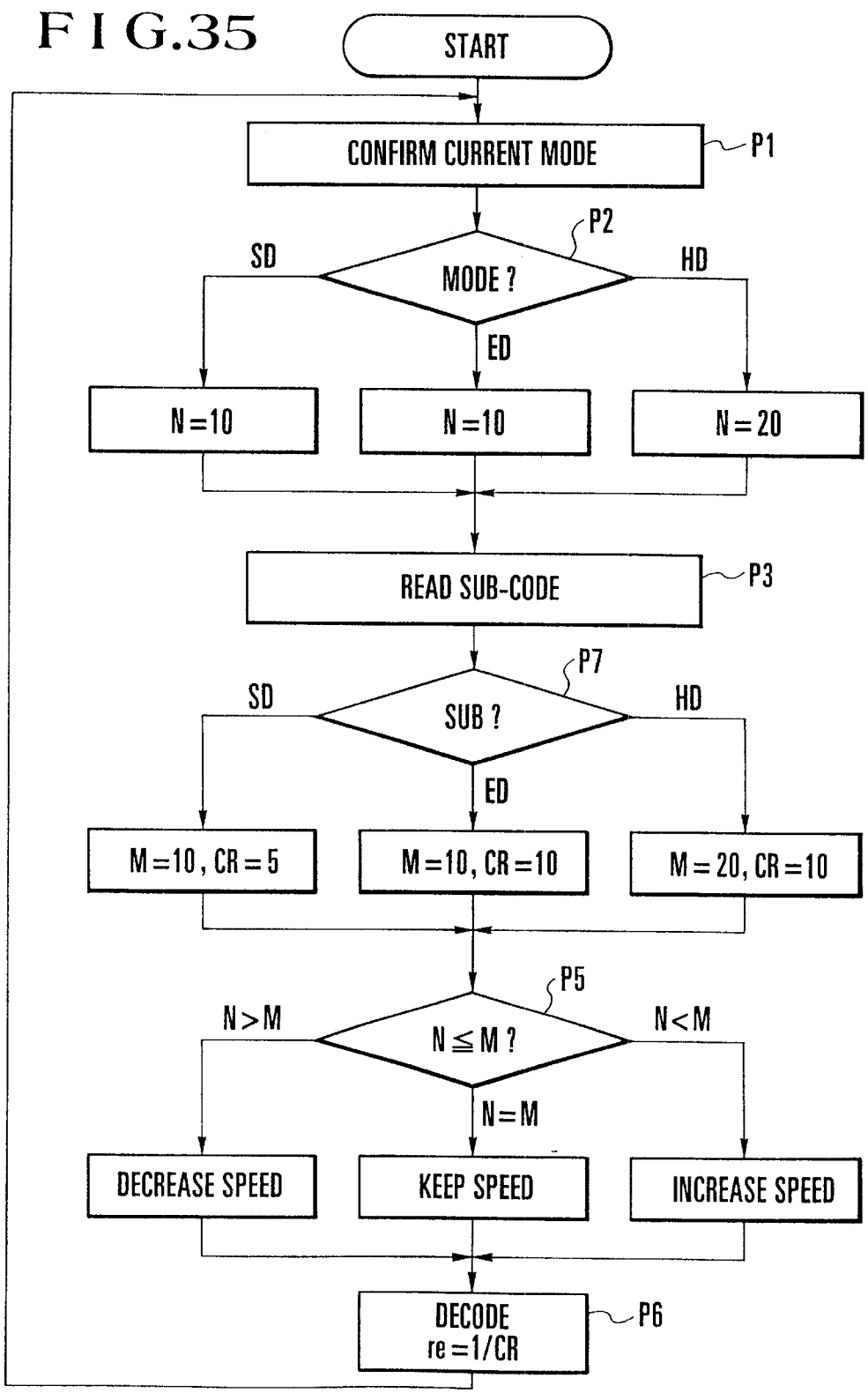
FIG. 35 is a flowchart of a mode setting process according to another embodiment of the present invention.

The manner of mode identification during reproduction and the sequence of control to be executed for the mode identification will be described below with reference to FIG. 35.

Step P1: The current reproduction running mode of a VTR is confirmed.

Step P2: A variable N is set to N=10 or N=20 according to which of the three modes is selected.

Step P3: A sub-code is detected from a reproduced digital signal, and the mode used during recording is identified on the basis of the sub-code of the reproduced digital signal, and the required reproduction mode is determined.

Step P4: The required number of tracks per unit time M and a data compression ratio CR are respectively set to M=10 or 20 and CR=5 or 10 in accordance with any one of the three modes which is indicated by reproduced ID data.

Step P5: The target value of capstan speed control is set in accordance with the result of a comparison between the values of the variables N and M.

The flow proceeds from Step P5 to any one of the succeeding three steps.

If N>M, it is determined that the current speed is greater than the speed used during recording, and the current speed is decreased.

If N<M, it is determined that the current speed is smaller than the speed used during recording, and the current speed is increased.

If N=M, the current speed is kept.

Step P6: A data expansion ratio is set to 1/CR and decoding is executed.

The flow returns to Step P1 for confirming the current mode, and the above-described routine is repeated.

To obtain a better understanding of the operation of the focusing control circuit 61 shown in FIG. 6, the relationship between system conversion (conversion between television systems) and TVAF (automatic focusing using a video signal) will be described below with reference to FIGS. 36 and 37.

The amount of information carried by an HDTV signal is approximately five times that of information carried by an existing broadcasting (SD) system. Further, the HDTV signal contains more high-frequency spectrum components than the SD signal.

Figure 36:
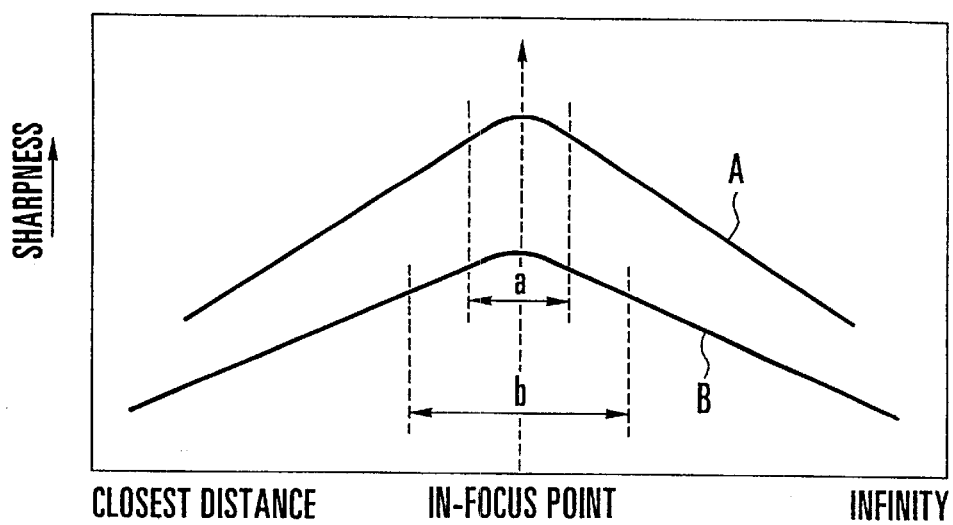
FIG. 36 is an explanatory view of the principle of hill climbing focus adjustment.

FIG. 36 shows the level variations of the amount of high-frequency components contained in the respective signals conforming to the two broadcasting systems with respect to the movement of the focus of an image pickup optical system between its closest-distance position and its infinity position. Both curves A and B reach the respective peaks at an in-focus point.

The curve A indicates the variation curve of the HDTV signal, while the curve B indicates the variation curve of the existing TV signal. The relationship between the heights at the in-focus point of the respective curves A and B is $A \geq B$.

The relationship between the widths of in-focus areas "a" and "b" in which to restart an AF operation is $a \leq b$. A sharper curve provides a smaller in-focus area for which AF restarting computations must be executed more frequently. In consequence, the curve A can achieve a better focusing characteristic in terms of focusing accuracy.

In other words, if HDTV video information which contains a larger amount of information is used, it is possible to achieve TVAF of higher performance.

For this reason, in an image pickup system employing a down converter, video information which is not yet processed by the down converter is suitably used as information for the aforesaid TVAF.

Figure 37:
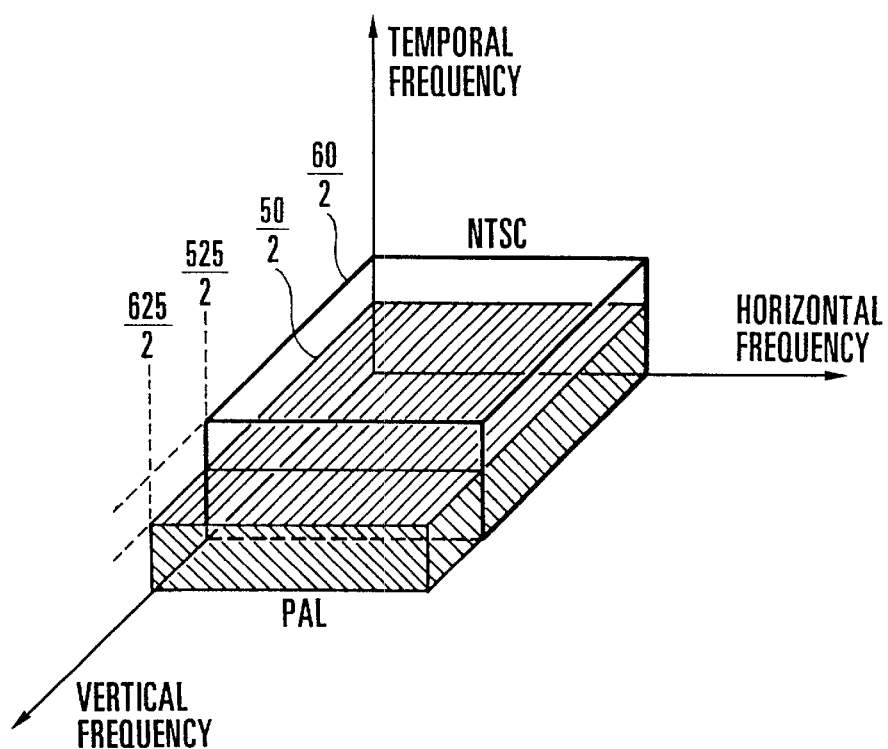
FIG. 37 is a view showing the relationships between TV forms and frequency characteristics.

Incidentally, as shown in FIG. 37, signal frequency components differ between the existing NTSC and PAL broadcasting systems as well. Accordingly, if optimum ones of the signal frequency components are selectively employed according to the kind of subject or photographic conditions (the illuminance of surroundings), it is possible to improve detection accuracy.

As shown in the coordinate plane of FIG. 37 which is defined by three kinds of frequency axes, if it is assumed that the horizontal frequencies of the NTSC and PAL video signals are the same, the NTSC system provides a picture which is made up of 60 fields/second with respect to the temporal frequency axis and 525 scanning lines with respect to the vertical frequency axis. Accordingly, the video signal components of the NTSC video signal are present in the frequency area defined by 60/2 and 525/2.

The PAL system provides a picture which is made up of 50 fields/second with respect to the temporal frequency axis and 625 scanning lines with respect to the vertical frequency axis. Accordingly, the video signal components of the PAL video signal are present in the frequency area defined by 50/2 and 625/2.

By selectively utilizing the different characteristics in accordance with the kind of subject whose image is to be picked up and the kind of photographic mode, it is possible to further improve the performance of TVAF.

The improvement of the performance of TVAF leads to not only an improvement in the diameter of a circle of least confusion at a final in-focus position but also an improvement in the stability of the process of finding an in-focus position (for example, an unstable behavior such as hunting or fluctuation can be reduced).

As described above, a subject image is photoelectrically converted by the CCD built in the HDTV camera 60 and an HD signal having a high degree of definition and a large amount of information is outputted.

An embodiment in which a concept called "scalability" is applied to the hierarchial structure of image information of a VTR to improve data handling will be described below with reference to FIGS. 38 to 49.

A technique for performing coding or decoding and recording or reproduction of HD information in a structure in which an NTSC signal is included in the HD information will be described below with illustrative reference to a two-layer structure consisting of the HD information and the NTSC information.

First, encoding of an NTSC signal is performed and the encoded sinal is transferred (or recorded).

Then, a non-transmitted or unrecorded information portion is transferred (or recorded).

Figure 38:
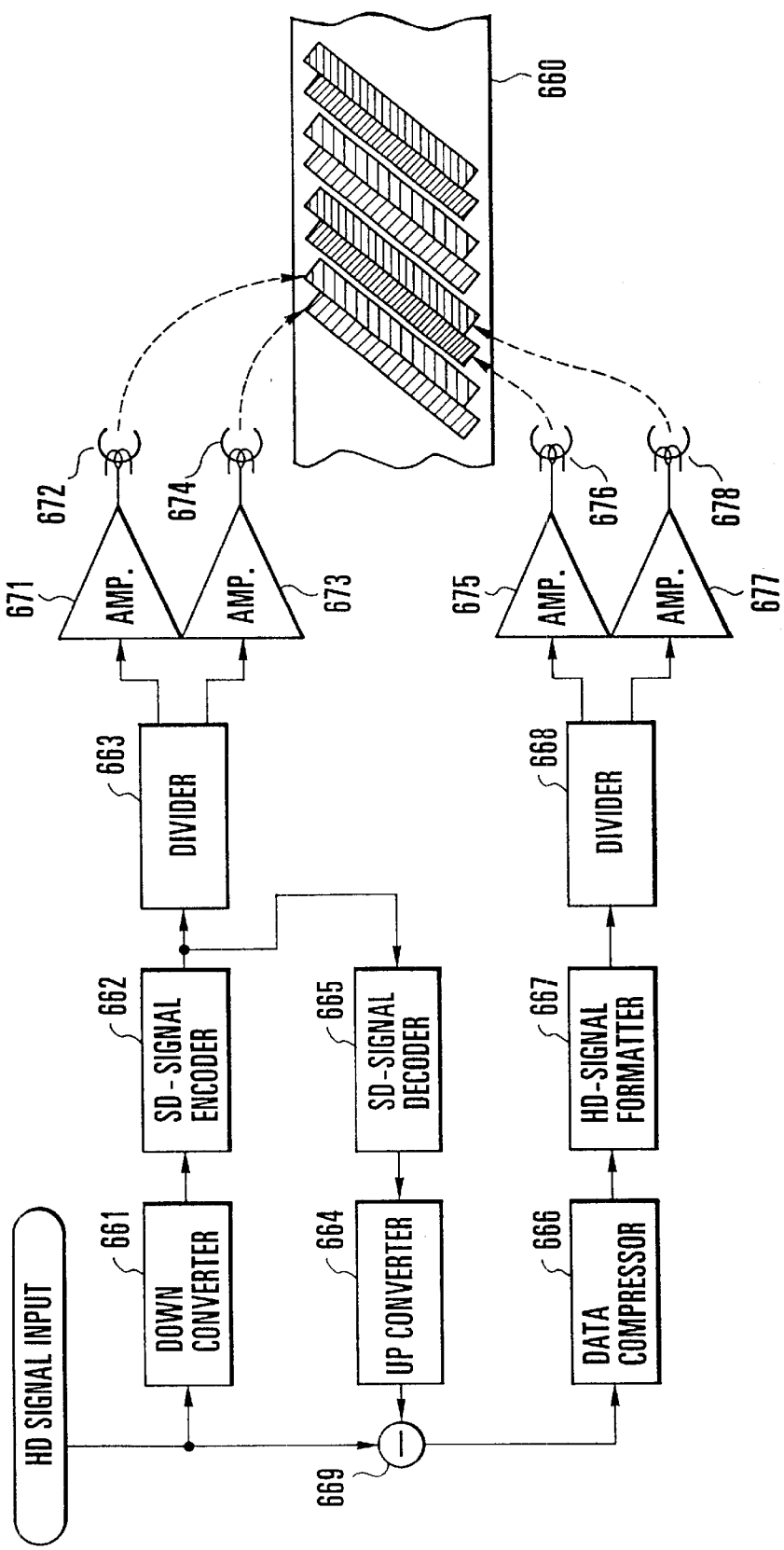
FIG. 38 is a schematic view of a hierarchical VTR recording apparatus according to another embodiment of the present invention.

An operation which is performed by recording means having the arrangement shown in FIG. 38 when an HD signal is inputted thereto will be described below.

The input HD signal is down-converted into an SD signal by a down converter 661, and the output of the down converter 661 is inputted to an SD-signal encoder 662. The encoded SD signal is divided into two channels by a recording channel divider 663, and the two outputs of the recording channel divider 663 are supplied to recording head amplifiers 671 and 673, respectively. Then, information recording tracks are formed on a magnetic recording medium 660 by magnetic recording heads 672 and 674. In the meantime, the output of the SD-signal encoder 662 is supplied to an SD-signal decoder 665 and, in an up converter 664, the output of the SD-signal decoder 665 is converted into an HD signal which contains an image distortion (error) occurring during encoding/decoding. If this degradation signal (recording SD information) is subtracted from the previous input signal, a difference signal for forming an HD signal can be obtained. Such a difference signal is formed by a subtractor 669, and the amount of data contained in the difference signal is reduced in a data compressor 666, and the output of the data compressor 666 is inputted into a data formatter 667 for causing the SD signal to conform to the recording standard of the HD signal. The output of the data formatter 667 is divided into two channels by a recording channel divider 668 similar to the aforesaid recording channel divider 663. The thus-obtained HD additional information is supplied to recording head amplifiers 675 and 677. Magnetic recording heads 676 and 678 sequentially record and form a pair of HD information recording tracks in an area adjacent to the pair of SD information recording tracks formed by the outputs of the divider 663 on the magnetic recording medium 660.

Figure 40:
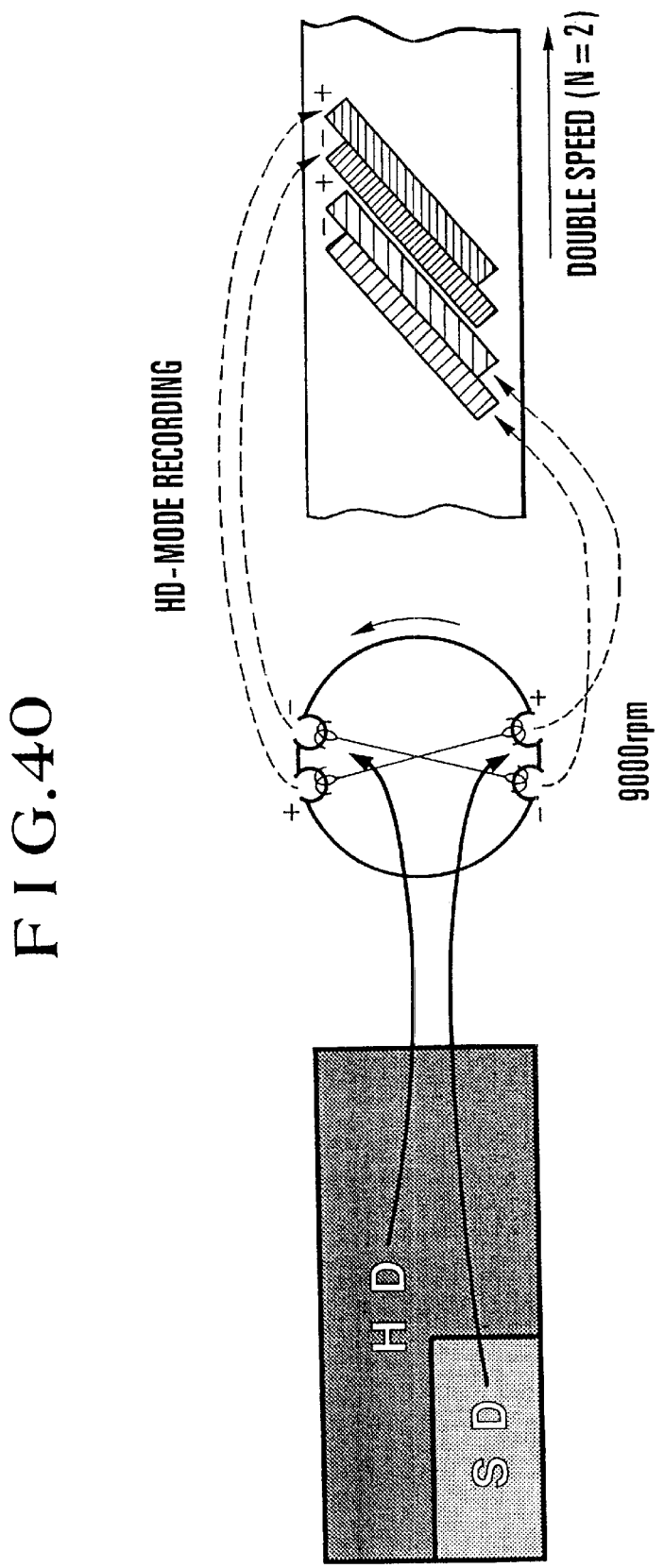
FIG. 40 is a conceptual view of the HD recording operation of the hierarchical VTR recording apparatus.

The manner of the above-described recording operation is diagrammatically shown in FIG. 40.

The SD information and the HD additional information, which are in the inclusive relationship shown by a symbolic block (left) representative of the amount of image information, are respectively recorded by two pairs of double azimuth (+/−) heads at the rate of two tracks at one time, and a total of four tracks constitute a basic unit.

The tape transporting speed used during the above-described recording operation is selected to be two times the tape transporting speed used during SD recording (N=2).

Figure 39:
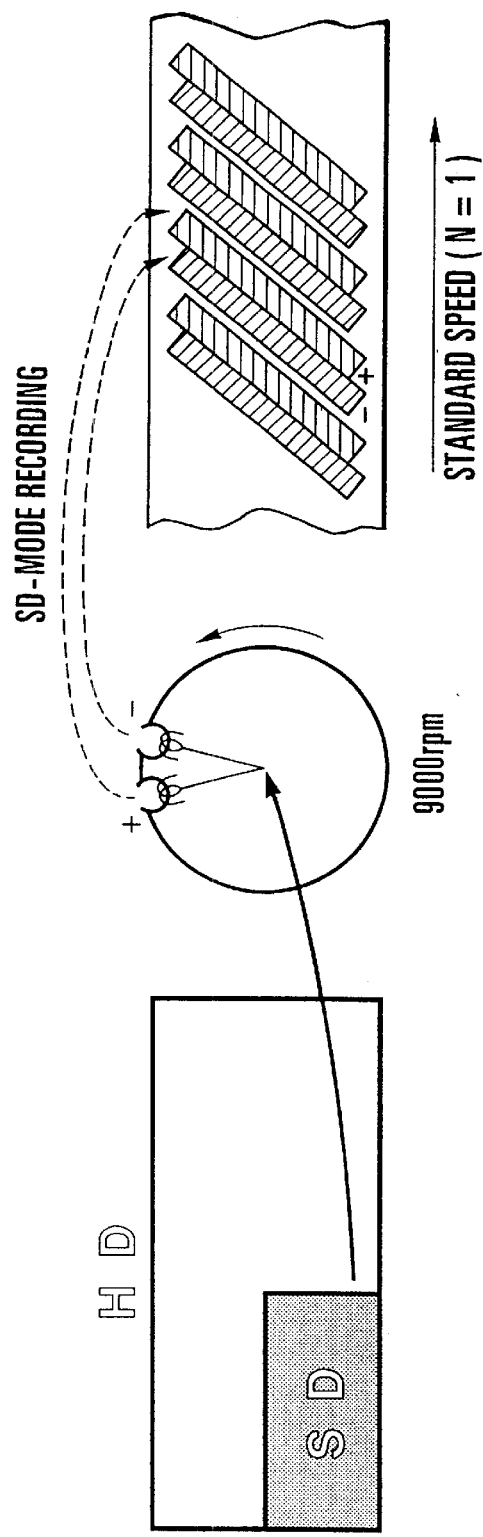
FIG. 39 is a conceptual view of the SD recording operation of the hierarchical VTR recording apparatus.

FIG. 39 is a schematic view showing the operation of an SD recording mode for recording only the SD information on a recording medium by one pair of double azimuth (+/−) heads at the rate of two tracks at one time.

The tape transporting speed used during this recording operation is selected to be a standard speed (N=1).

Figure 41:
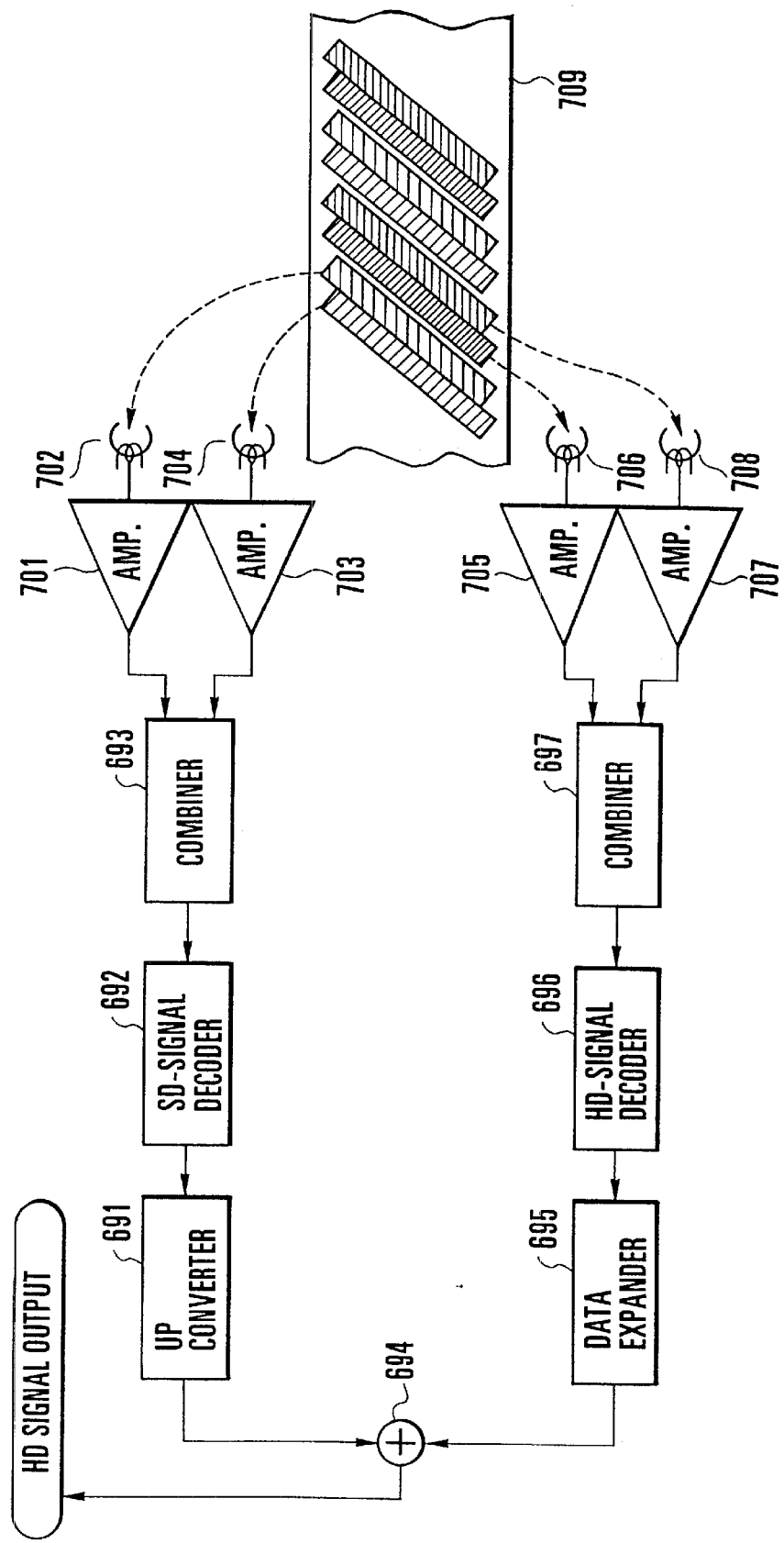
FIG. 41 is a schematic block diagram of a hierarchical VTR reproducing apparatus (HD) according to another embodiment of the present invention.

An example of the arrangement of reproducing means for reproducing arbitrary information from a magnetic tape on which SD information and HD additional information are recorded in the above-described manner will be described below, and the reproducing operation of the reproducing means will be described with reference to FIG. 41.

Signals, which are respectively outputted from a pair of magnetic heads 702 and 704 for tracing only a pair of SD information recording tracks on a magnetic tape 709 recorded in an HD recording mode, are respectively amplified by head amplifiers 701 and 703. The signals outputted from the head amplifiers 701 and 703 are integrated by a data combiner 693, and the output of the data combiner 693 is decoded from its recording data format into an SD signal, such as an NTSC signal, by an SD-signal decoder 692. The SD signal is converted into an HD-signal format by an up converter 691. The processing of this SD-HD format conversion is the inverse of the processing performed by the above-described down converter.

Signals, which are respectively outputted from a pair of magnetic heads 706 and 708 for tracing only a pair of HD additional information recording tracks on the magnetic tape 709 recorded in the HD recording mode, are respectively amplified by head amplifiers 705 and 707. The signals outputted from the head amplifiers 705 and 707 are integrated by a data combiner 697, and the output of the data combiner 697 is decoded from its recording data format into a compressed HD additional signal by an HD-signal decoder 696. The compressed HD additional signal is converted into an HD additional signal by a data expander 695.

The SD information and the HD additional information which have been converted into a common HD signal format in the above-described manner are added together by an adder 694, whereby the original HD signal is reconstructed.

Figure 42:
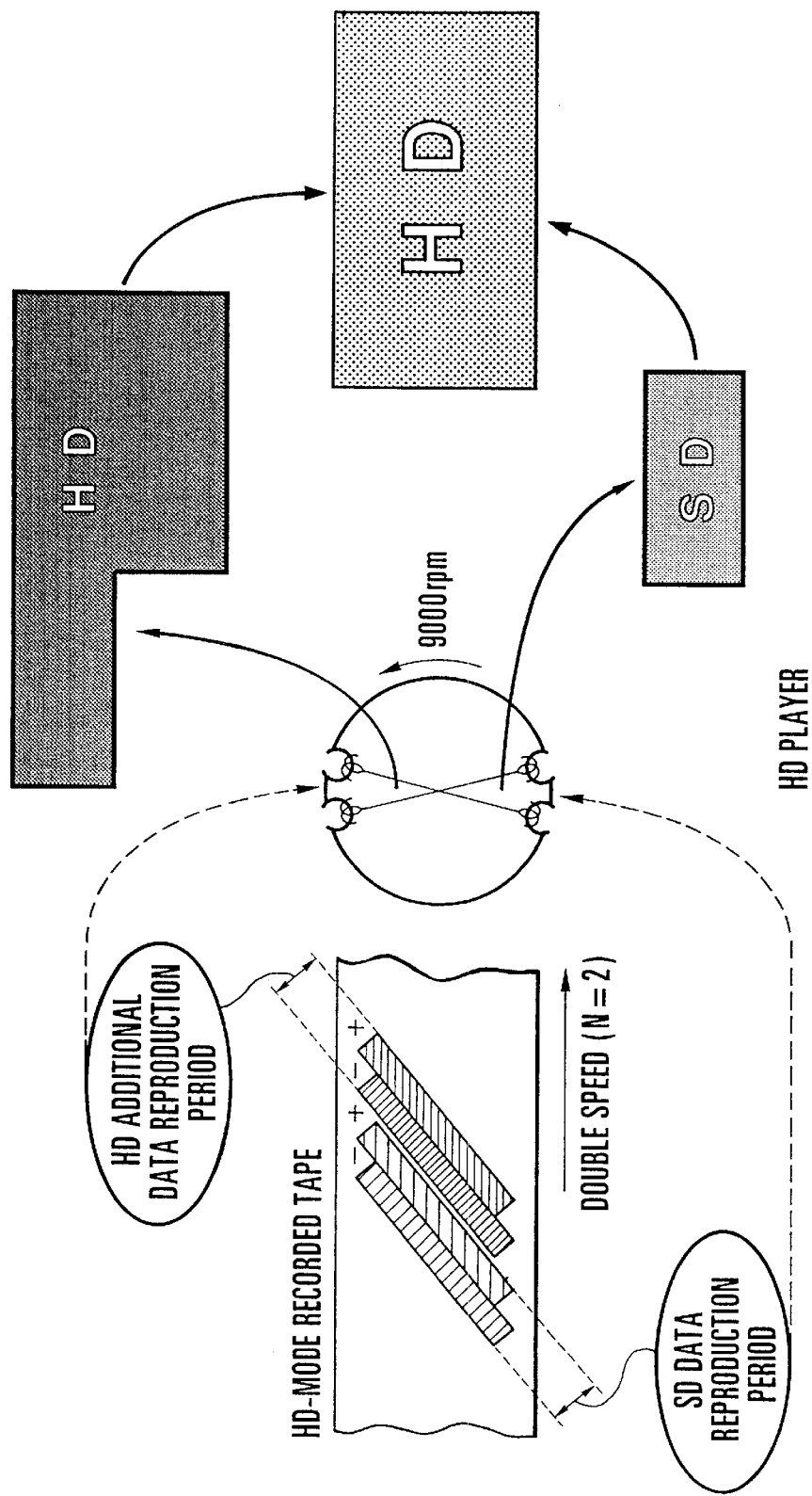
FIG. 42 is a conceptual view of the HD reproducing operation of the hierarchical VTR reproducing apparatus.

FIG. 42 schematically shows the manner of the above-described reproduction from the magnetic tape recorded in the HD recording mode.

Both the period during which a pair of magnetic heads for tracing only a pair of HD additional information recording tracks on a magnetic tape recorded in the HD recording mode trace the magnetic tape and the period during which a pair of magnetic heads for tracing a pair of SD information recording tracks on the magnetic tape trace the magnetic tape are selected on the basis of the angle over which the magnetic tape is wrapped around a head drum. If each of the periods is selected to be 180 degrees, an HD additional data reproduction period and an SD data reproduction period appear alternately at intervals of one-half rotation of the head drum.

During each of the data reproduction periods, the signals recorded on two tracks are reproduced by either of the pairs of double azimuth heads provided on the rotary drum. The signals recorded on a total of four tracks are reproduced as a basic unit.

Accordingly, the signals recorded on four tracks which constitute the basic unit of the aforesaid information can be reproduced during one rotation of the head drum. The inclusive and combination relationships between the SD information and the HD additional information which are reproduced in the above-described manner are shown in the right-hand part of FIG. 42 by using symbolic blocks each representative of the amount of image information.

Compatible reproduction which is most important in the present invention will be described below.

Figure 49:
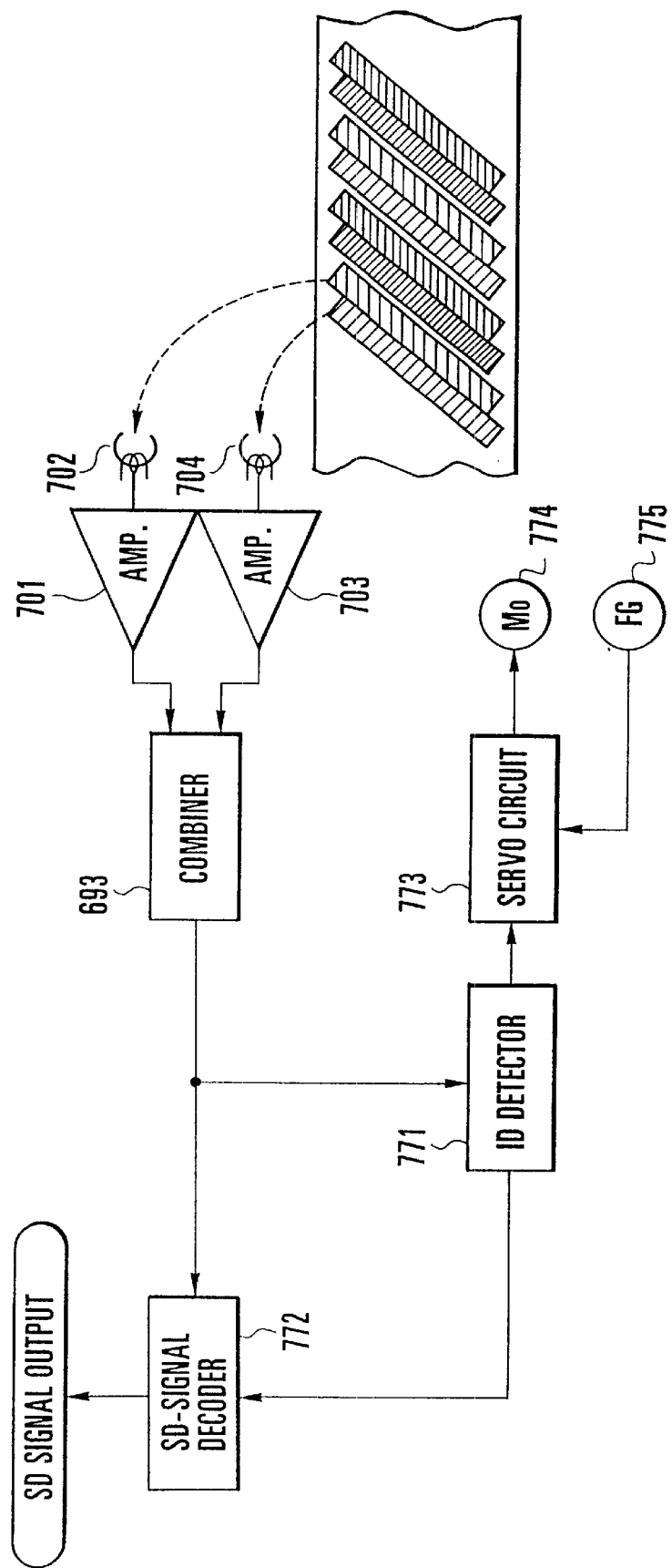
FIG. 49 is a schematic view showing a hierarchical VTR reproducing apparatus (SD).

The following description refers to a case where an SD recording apparatus having no recording function for the HD recording mode is used to perform reproduction from a magnetic tape recorded in the HD recording mode, as shown in FIG. 49.

Figure 44:
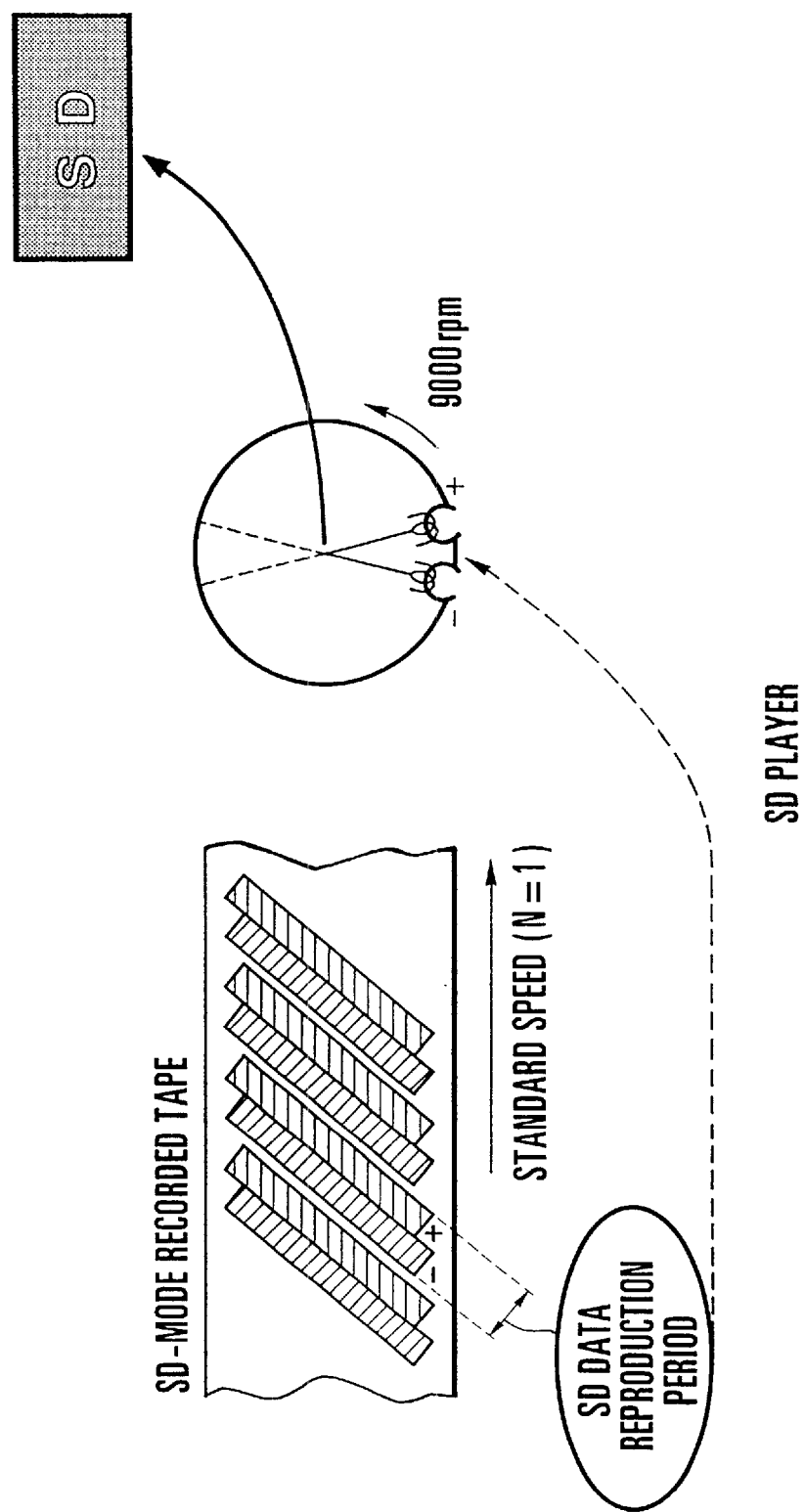
FIG. 44 is a conceptual view showing the operation a hierarachical VTR to perform SD reproduction of an SD recording.

FIG. 44 shows the manner in which a pair of magnetic heads for tracing a pair of SD information recording tracks on a magnetic tape recorded in the SD recording mode traces the magnetic tape to reproduce an SD signal. Only one pair of double azimuth heads are provided on a head drum, and SD information alone is recorded on each track of the magnetic tape. In this case, each SD data reproduction period occurs only once during one rotation of the head drum. Since the tape transporting speed is the standard speed (N=1), the SD information recorded on each recording track is sequentially reproduced without skipping any of the recording tracks. FIG. 44 schematically shows the manner of the above-described reproducing operation.

If recording-mode identification information, such as ID, is detected from a video area or a sub-code area by the detector 771 shown in FIG. 49 during the SD recording mode reproducing operation, a compatible reproduction mode is selected. When a servo circuit 773 receives an instruction from the detector 771, the servo circuit 773 sets the current tape transporting speed to a double speed equal to the tape transporting speed for the HD reproduction mode. Incidentally, a motor 774 is provided for driving a capstan, and a frequency generator (FG) 775 is provided so that the servo circuit 773 can confirm the state of rotation of the capstan.

Figure 43:
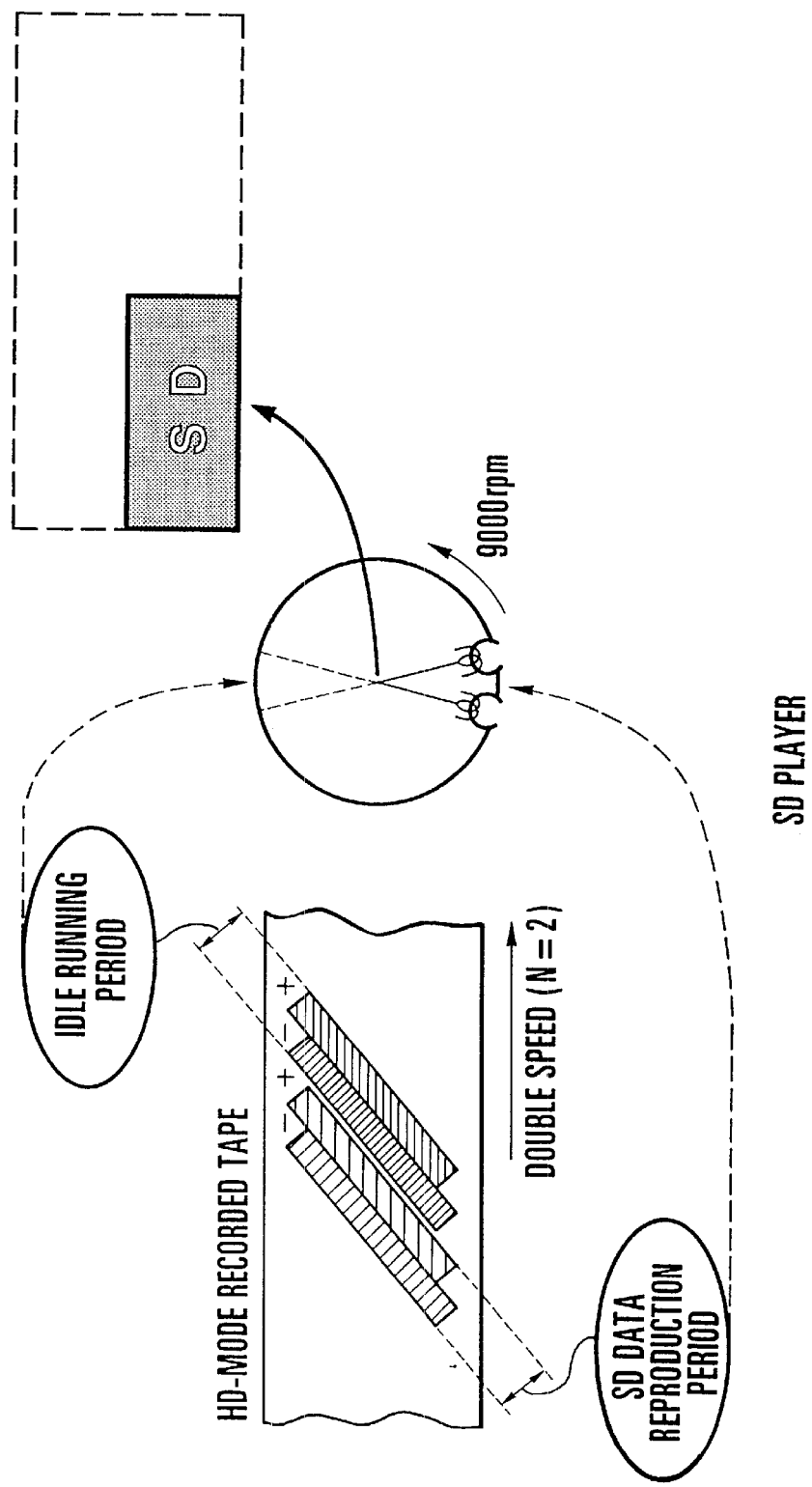
FIG. 43 is a conceptual view of SD reproduction from an HD recorded medium to be performed by the hierarchical VTR reproducing apparatus.

The pair of double azimuth heads for SD signals, which are provided on the head drum, trace only pairs of SD information recording tracks on a magnetic tape recorded in the HD recording mode. However, since no magnetic heads for HD signals are provided, the magnetic tape is transported without tracing a pair of HD additional information tracks. Accordingly, an HD addition data track idle running period and an SD data reproduction period alternately appear at intervals of one-half rotation of the head drum. FIG. 43 schematically shows the manner of the above-described reproducing operation.

Reproduction from only two tracks for SD signals out of four tracks which constitute one basic unit is performed by the pair of double azimuth (+/−) heads provided on the rotary drum, at intervals of one rotation period.

The signal reproduced in the above-described manner is converted into an SD signal, such as an NTSC or PAL signal, by the SD-signal decoder 772 shown in FIG. 49, and the SD signal is outputted from the SD-signal decoder 772. The manner of the above-described reproduction from the recorded tracks is shown in FIG. 45 in the form of a recording track pattern.

Figure 45:
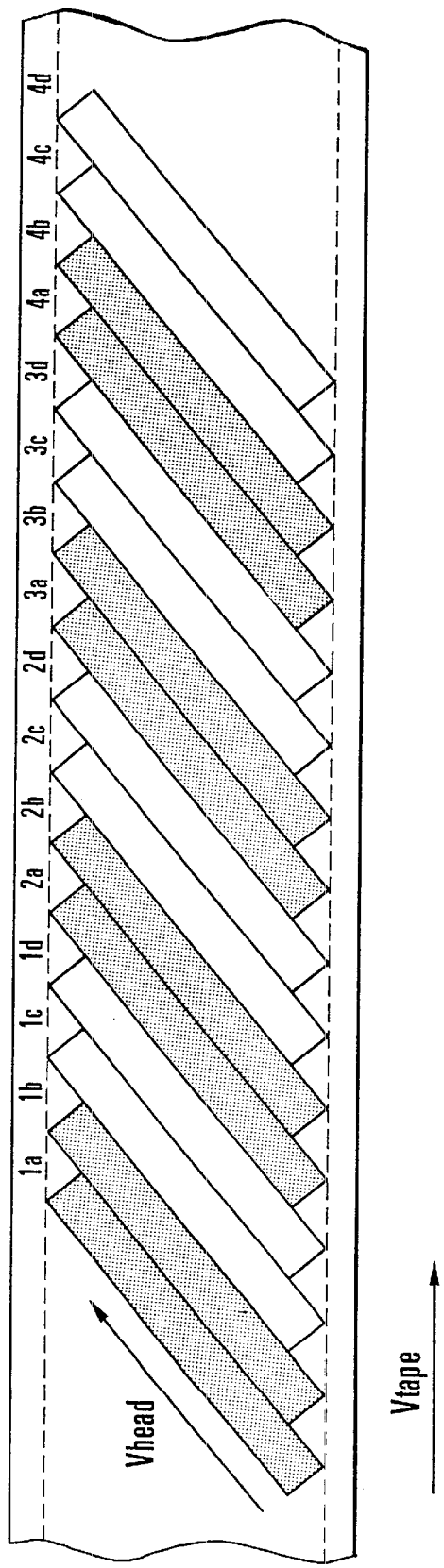
FIG. 45 is a track view showing the SD reproduction of an HD recording by the hierarchical VTR.

The recording tracks shown in FIG. 45 constitute groups each consisting of four tracks indicated by characters "a" to "d" affixed to the respective numbers.

The characters "a" and "b" indicate tracks for SD signals (represented by meshes), and the characters "c" and "d" indicate additional tracks for HD signals.

In the compatible reproduction mode, reproduction from only the tracks "a" and "b" is performed, and no reproduction from the track "c" nor "d" is performed.

Figure 46:
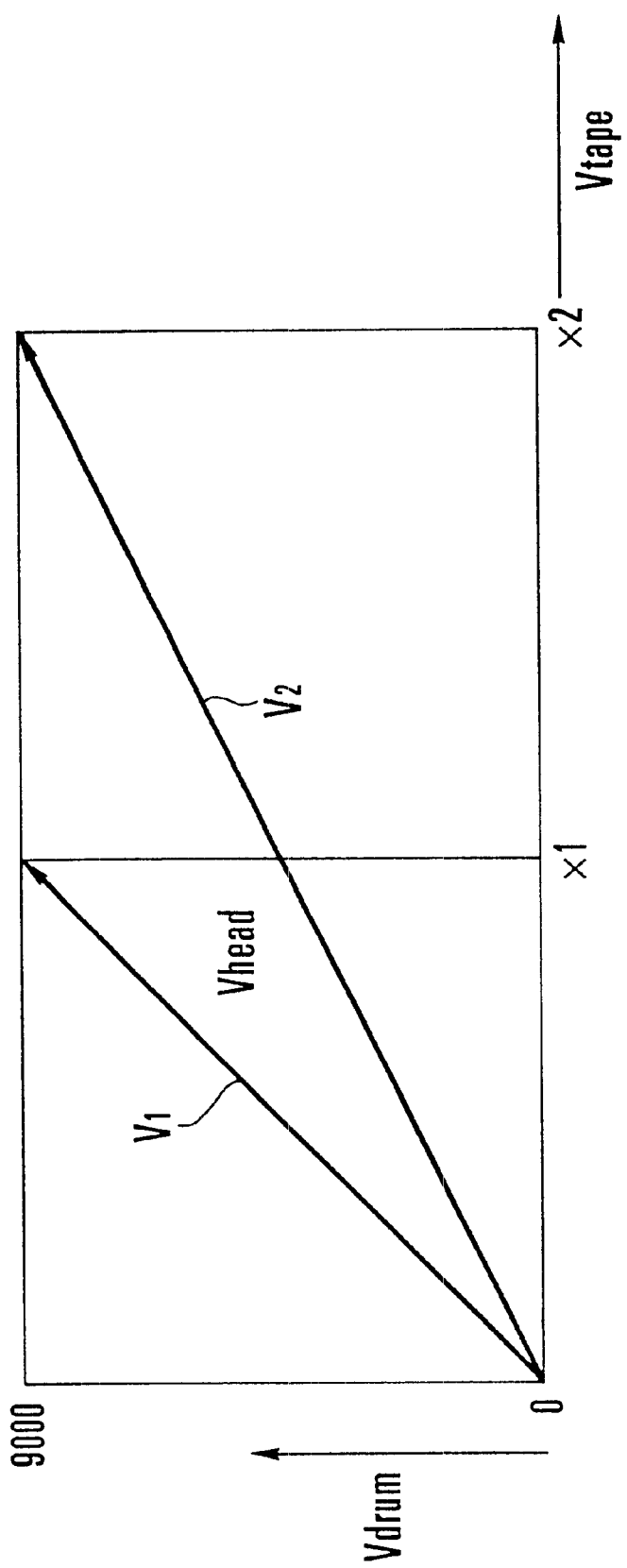
FIG. 46 is a view showing two kinds of trace angles for HD and SD in the hierarchical VTR.

FIG. 46 is a graphic representation showing a head relative speed Vhead determined by a tape transporting speed Vtape and a head drum rotational speed Vdrum, and the horizontal and vertical axes represent the tape transporting speed-Vtape and the head drum rotational speed Vdrum, respectively.

Since the head relative speed Vhead reaches 9,000 rotations during the SD mode, it is not practical to increase the rotational speed to a further extent for the purpose of coping with the HD mode. If the rotational speed is selected to be not less than 9,000 rotations, two kinds of trace angles are formed in the case of the respective standard and double speeds, as shown in FIG. 46.

A line V1 indicates the case of reproduction of an SD mode recording, and a line V2 indicates the case of reproduction of an HD mode recording. In the case of the compatible reproduction mode according to the present embodiment, the tape transporting speed Vtape and the drum rotation speed Vhead are completely the same as those used in the HD reproduction mode, the head trace V2 is selected so that an SD track portion can be traced without any problem. Each of FIGS. 47 and 48 is a table showing whether each of the SD and HD reproduction modes can be used for magnetic tapes recorded in the respective SD and HD recording modes, and FIG. 47 shows the case of an SD signal reproducing apparatus, while FIG. 48 shows the case of an HD signal reproducing apparatus.

As can be seen from FIGS. 47 and 48, not only the HD signal reproducing apparatus but also the SD signal reproducing apparatus can effect reproduction from any of the magnetic tapes recorded in the SD recording mode or the HD recording mode.

It is to be noted that since reproduction from a magnetic tape recorded in the SD recording mode can be performed in the HD-signal format, "recording mode SD/reproduction mode HD" of FIG. 48 can also be regarded as "possible" although the image quality, such as resolution, is equivalent to SD quality.

In the present embodiment, although the concept of a hierarchical coding system has been described with illustrative reference to pyramidal coding, the kind of coding system is not limited to the pyramidal coding. For example, another hierarchical coding technique, such as sub-band coding, can of course be used without departing from the scope and spirit of the present invention.

Incidentally, the head relative speed Vhead is not limited to 9,000 rotations, and, for example, 4,500 rotations may be selected. It is also possible to adopt an arrangement which switches the head relative speed Vhead as well as the characteristics of its control system on the basis of a decision as to whether the HD mode or the SD mode is selected.

According to the embodiment utilizing the above-described scalability, it is possible to achieve a remarkable w improvement in the characteristic of compatible reproduction from a recorded medium, which cannot be attained by conventional image recording systems because of their different coding systems.

Also, it is possible to effect reproduction from a recording medium recorded in any recording mode, by means of not only higher-order equipment but also lower-order equipment.

Furthermore, since a lower-order system needs only to have a servo mechanism for effecting switching between media driving speeds, users can easily introduce lower-order systems without making large prior investments.

What is claimed is:

1. An image processing apparatus for reproducing image data recorded on a recording medium by selectively using a first recording mode to record hierarchically encoded image data of all hierarchies and a second recording mode to record image data of some of the hierarchies, the image data of all hierarchies being composed of SD (Standard Definition) image data obtained by down-converting the first ED (High Duration) image data and a differential data between the first HD image data and a second HD image data obtained by up-converting the SD image data, the differential data being not recorded but said SD image data being recorded in the second recording mode, said apparatus comprising:

a) a reproducing unit, arranged to reproduce the image data from the recording medium; and b) a controller arranged to control a reproducing operation of said reproducing unit, wherein recording mode identification data for the identification of the recording mode is recorded on a sub-code area formed on the recording medium said reproducing unit reproduces the recording mode identification data, and said controller controls a reproducing operation of the image data based on the reproduced recording mode identification data.

2. An apparatus according to claim 1, wherein said controller controls the range of the hierarchy when the image data is reproduced.

3. An apparatus according to claim 1, wherein said controller controls the reading rate when the image data is read from the recording medium.

4. An apparatus according to claim 1, wherein the image data of each hierarchy is recorded on a different area respectively formed on the recording medium.

5. An image processing method for reproducing image data recorded on a recording medium by selectively using a first recording mode to record hierarchically encoded image data of all hierarchies and a second recording mode to record image data of some of the hierarchies, the image data of all hierarchies being composed of SD (Standard Definition) image data obtained by down-converting the first HD (High Definition) image data and a differential data between the first HD image data and a second HD image data obtained by up-converting the SD image data, the differential data being not recorded but said SD image data being recorded in the second recording mode, said method comprising the steps of:

a) reproducing the image data from the recording medium; and b) controlling a reproducing operation of said reproducing step, wherein recording mode identification data for the identification of the recording mode is recorded on a sub-code area formed on the recording medium, the recording mode identification data is reproduced in said reproducing step, and a reproducing operation of the image data is controlled in said controlling step based on the reproduced recording mode identification data.

6. An image data recording apparatus comprising:

a) an inputting unit, arranged to input first (High Definition) image data;

b) a down-converting unit, arranged to down-convert the first HD image data to generate SD (Standard Definition) image data;

c) an up-converting unit, arranged to up-convert the SD image data to generate second HD image data;

d) a generating unit, arranged to generate differential data between the first HD image data and the second HD image data; and e) a recording unit, arranged to record the SD image data and the differential data in different recording areas, respectively, on a recording medium.

7. An image data recording method comprising the steps of:

a) inputting first HD (High Definition) image data;

b) down-converting the first HD image data to generate SD (Standard Definition) image data;

c) up-converting the SD image data to generate second HD image data;

d) generating differential data between the first HD image data and the second HD image data; and e) recording the SD image data and the differential data in different recording areas, respectively, on an recording medium.

* * * * *

UNITED STATES PATENT AND TRADEMARK OFFICE
CERTIFICATE OF CORRECTION

PATENT NO. : 6,453,120 B1
DATED : September 17, 2002
INVENTOR(S) : Koji Takahashi et al.

It is certified that error appears in the above-identified patent and that said Letters Patent is hereby corrected as shown below:

<u>Title page,</u>
Item [74], delete "Dale" and insert -- Daley --.

<u>Column 22,</u>
Line 22, delete "VTRS" and insert -- VTRs --.

<u>Column 27,</u>
Line 38, after "remarkable" delete "w".
Line 56, delete "ED" and insert -- HD --.

<u>Column 28,</u>
Line 39, after "first" insert -- HD --.

Signed and Sealed this

Fourth Day of November, 2003

JAMES E. ROGAN
*Director of the United States Patent and Trademark Office*